(12) United States Patent
Spjuth et al.

(10) Patent No.: US 10,346,011 B2
(45) Date of Patent: Jul. 9, 2019

(54) USER INTERFACE FOR THE APPLICATION OF IMAGE EFFECTS TO IMAGES

(71) Applicant: Nokia Technologies Oy, Espoo (FI)

(72) Inventors: Dan Spjuth, Malmo (SE); Shahil Soni, Espoo (FI); David Fredh, Malmo (SE); Esa Kankaanpää, Hyvinkää (FI); Johan Windmark, Lund (SE); Ari Liusaari, Helsinki (FI); Martin Karlsson, Espoo (FI)

(73) Assignee: Nokia Technologies Oy, Espoo (FI)

( * ) Notice: Subject to any disclaimer, the term of this patent is extended or adjusted under 35 U.S.C. 154(b) by 586 days.

(21) Appl. No.: 14/764,012

(22) PCT Filed: Jan. 31, 2014

(86) PCT No.: PCT/FI2014/050078
§ 371 (c)(1),
(2) Date: Jul. 28, 2015

(87) PCT Pub. No.: WO2014/122362
PCT Pub. Date: Aug. 14, 2014

(65) Prior Publication Data
US 2015/0363085 A1 Dec. 17, 2015

(30) Foreign Application Priority Data
Feb. 8, 2013 (GB) .................................. 1302296.7

(51) Int. Cl.
*G06F 3/0484* (2013.01)
*G06T 11/60* (2006.01)
*G06F 3/0482* (2013.01)

(52) U.S. Cl.
CPC ........ *G06F 3/04845* (2013.01); *G06F 3/0482* (2013.01); *G06F 3/04842* (2013.01); *G06T 11/60* (2013.01)

(58) Field of Classification Search
CPC . G06F 3/04845; G06F 3/04842; G06F 3/0482
See application file for complete search history.

(56) References Cited

U.S. PATENT DOCUMENTS

| 6,665,342 B1 | 12/2003 | Brown et al. |
| 8,615,111 B2 | 12/2013 | Garten |

(Continued)

FOREIGN PATENT DOCUMENTS

| EP | 2039156 A2 | 3/2009 |
| EP | 2 360 644 A2 | 8/2011 |

(Continued)

OTHER PUBLICATIONS

International Search Report and Written Opinion received for corresponding Patent Cooperation Treaty Application No. PCT/FI2014/050078, dated Jun. 5, 2014, 11 pages.

(Continued)

*Primary Examiner* — Anil K Bhargava
(74) *Attorney, Agent, or Firm* — Alston & Bird LLP

(57) ABSTRACT

An apparatus comprising: at least one processor; and at least one memory including computer program code, the at least one memory and the computer program code configured to, with the at least one processor, cause the apparatus to perform at least the following: in response to user input selecting a selectable marker (1720, 1725, 1730, 1820, 1825, 1830, 1940, 2020), the selectable marker marking the position of at least one identified feature (1705, 1710, 1715, 1810, 1815, 1910, 1915, 2005) in an image which is hideable from view using a region of the image surrounding the identified feature, hide or show the identified feature.

19 Claims, 16 Drawing Sheets

(56) References Cited

U.S. PATENT DOCUMENTS

| | | | |
|---|---|---|---|
| 2004/0125115 A1* | 7/2004 | Takeshima | G06T 13/80 345/634 |
| 2005/0240882 A1* | 10/2005 | Morita | G06K 9/033 715/764 |
| 2007/0263077 A1 | 11/2007 | Dhuey et al. | |
| 2008/0131010 A1* | 6/2008 | Wilensky | G06F 3/04842 382/238 |
| 2009/0044117 A1* | 2/2009 | Vaughan | G11B 27/034 715/716 |
| 2009/0160809 A1 | 6/2009 | Yang et al. | |
| 2009/0201382 A1 | 8/2009 | Makino | |
| 2009/0309990 A1 | 12/2009 | Levoy et al. | |
| 2010/0040349 A1 | 2/2010 | Landy | |
| 2011/0074809 A1 | 3/2011 | Chen et al. | |
| 2011/0115928 A1 | 5/2011 | Cocoran et al. | |
| 2011/0161875 A1* | 6/2011 | Kankainen | G06F 3/0481 715/810 |
| 2012/0172700 A1* | 7/2012 | Krishnan | A61B 6/032 600/407 |
| 2012/0242779 A1 | 9/2012 | Liu | |
| 2012/0242851 A1 | 9/2012 | Fintel et al. | |
| 2012/0243802 A1 | 9/2012 | Fintel et al. | |
| 2012/0249853 A1 | 10/2012 | Krolcyzk et al. | |
| 2012/0257071 A1 | 10/2012 | Prentice | |
| 2012/0308162 A1 | 12/2012 | Le Gue | |
| 2013/0106899 A1 | 5/2013 | Bhatt | |
| 2013/0215221 A1 | 8/2013 | Wang et al. | |
| 2013/0219271 A1* | 8/2013 | Sanghavi | G06Q 30/0251 715/273 |
| 2013/0239057 A1 | 9/2013 | Ubillos et al. | |
| 2013/0265453 A1 | 10/2013 | Middleton et al. | |
| 2013/0271490 A1 | 10/2013 | Brown | |
| 2013/0342470 A1* | 12/2013 | Acar | G09B 5/062 345/173 |
| 2014/0101590 A1* | 4/2014 | Lindskob | G06T 11/00 715/771 |
| 2014/0310305 A1* | 10/2014 | Christiansen | G06F 17/241 707/769 |
| 2014/0372953 A1* | 12/2014 | Laurance | G06F 19/26 715/835 |

FOREIGN PATENT DOCUMENTS

| | | |
|---|---|---|
| WO | WO-2008/008578 | 1/2008 |
| WO | WO-2013/158393 A1 | 10/2013 |

OTHER PUBLICATIONS

"Scalado Remove—Capture a Clear View", Feb. 13, 2012. Retrieved from the Internet: URL:http://www.youtube.com/watch?v=flNomXIIWr4.

Myriam Joire, "Scalado Remove Clears Up Your Photos, We Go Hands-on (Video)", Feb. 14, 2012. Retrieved from the Internet: URL:http://www.engadget.com/2012/02/14/scalado-remove-clears-up-your-phontos-we-go-hands-on-video/.

"Digital Photographs in Physics." Vernier Software & Technology [Retrieved May 16, 2017]. Retrieved from the Internet <URL: http://www.vernier.com/innovate/digital-photographs-in-physics/> (dated May 16, 2011). 5 pages.

"Easily Remove Unwanted Objects From Photos on Android, iOS." CNET [Retrieved May 16, 2017]. Retrieved from the Internet: <URL: http://howto.cnet.com/8301-11310_39-57432445-285/easily-remove-unwanted-objects-from-photos-onandroid-ios/> (dated May 11, 2012). 6 pages.

"Event—Ariel Dynamics." Ariel Gideon [Retrieved May 28, 2014]. Retrieved from the Internet: <URL: http://www.arielnet.com/cloud/pages/show/adi-gba-01348/event> (Dated Jun. 13, 1997) 4 pages.

"Inpaint Review." Abouttech [Retrieved May 16, 2017] Retrieved from the Internet: <URL: http://graphicssoft.about.com/od/digitalphotosoftware/fr/Inpaint-Review.htm> (dated 2015). 7 pages.

"Strobe Image—Ariel Dynamics." Ariel Gideon [Retreived May 28, 2014]. Retrieved from the Internet: <URL: http://www.arielnet.com/pages.show/adi-gba-01333/strobe-image.> (Dated May 29, 1997) 2 pages.

"Strobe Image Window—Ariel Dynamics." Ariel Gideon [Retrieved May 28, 2014]. Retrieved from the Internet: <URL: http://www.arielnet.com/cloud/pages/show/adi-gba-01421/strobe-image-window> (Dated Aug. 25, 1997) 4 pages.

"Using Smart Shoot on Your Nokia Lumia 920 and Lumia 820." Nokia [Retrieved May 16, 2017] Retrieved from the Internet: <URL: http://conversations.nokia.com/2012/12/12/using-smart-shoot-on-your-nokia-lumia-920-and-lumia-8201> (dated Dec. 12, 2012). 6 pages.

Koppal, Sanjeev et al. "Illustrating Motion Through DLP Photography." IEEE Computer Society Conference on Computer Vision and Pattern Recognition Workshops, CVPR Workshops, 2009, 8 pages.

Kyle Epic Mendoza, "Tutorial—Action Sequence Photography with Adobe Photoshop CS6" Youtube [retrieved May 30, 2014]. Retrived from the Internet: <URL: http://www.youtube.com/watch?v=BPlon7pCGW8>. (dated Oct. 24, 2012). 1 page.

Liang, Chia-Kai et al. "Touchtone: Interactive Local Image Adjustment Using Point-and-swipe." Eurographics, vol. 29, No. 2, 2010, 9 pages.

International Search Report and Written Opinion received for corresponding Patent Cooperation Treaty Application No. PCT/FI2014/050077, dated Jun. 10, 2014, 11 pages.

Office Action for European Patent Application No. 14706314.3 dated Feb. 20, 2017, 4 pages.

Office Action for European Patent Application No. 14706315.0 dated Feb. 20, 2017, 4 pages.

Office Action for U.S. Appl. No. 14/763,616 dated Feb. 2, 2018, 22 pages.

Office Action for U.S. Appl. No. 14/763,616 dated Dec. 28, 2018.

Office Action for U.S. Appl. No. 14/763,616 dated Jul. 16, 2018.

Office Action for European Application No. 14 706 314.3 dated Aug. 16, 2018, 6 pages.

Office Action for European Application No. 14 706 315.0 dated Aug. 16, 2018, 6 pages.

Maurizio Pesce: "Scalado Strobe, all the action in one shot" [online] [retrieved Sep. 4, 2018]. Retrieved from the Internet: <URL: https://www.youtube.com/watch?v=j8P-HgEi50o>. (dated Mar. 1, 2012) 1 page.

Nielsen, F. et al., *ClickRemoval: Interactive Pinpoint Image Object Removal*, 13th Annual ACM International Conference on Multimedia, (dated Nov. 2005) pp. 315-318.

Examiner Interview Summary for U.S. Appl. No. 14/763,616 dated Mar. 28, 2019, 3 pages.

* cited by examiner

Figure 3
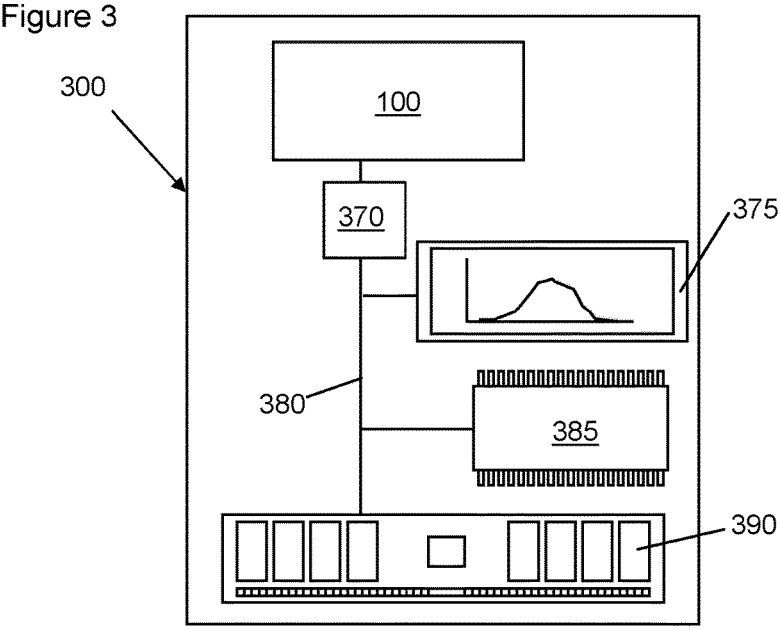
Figure 4
Figure 5

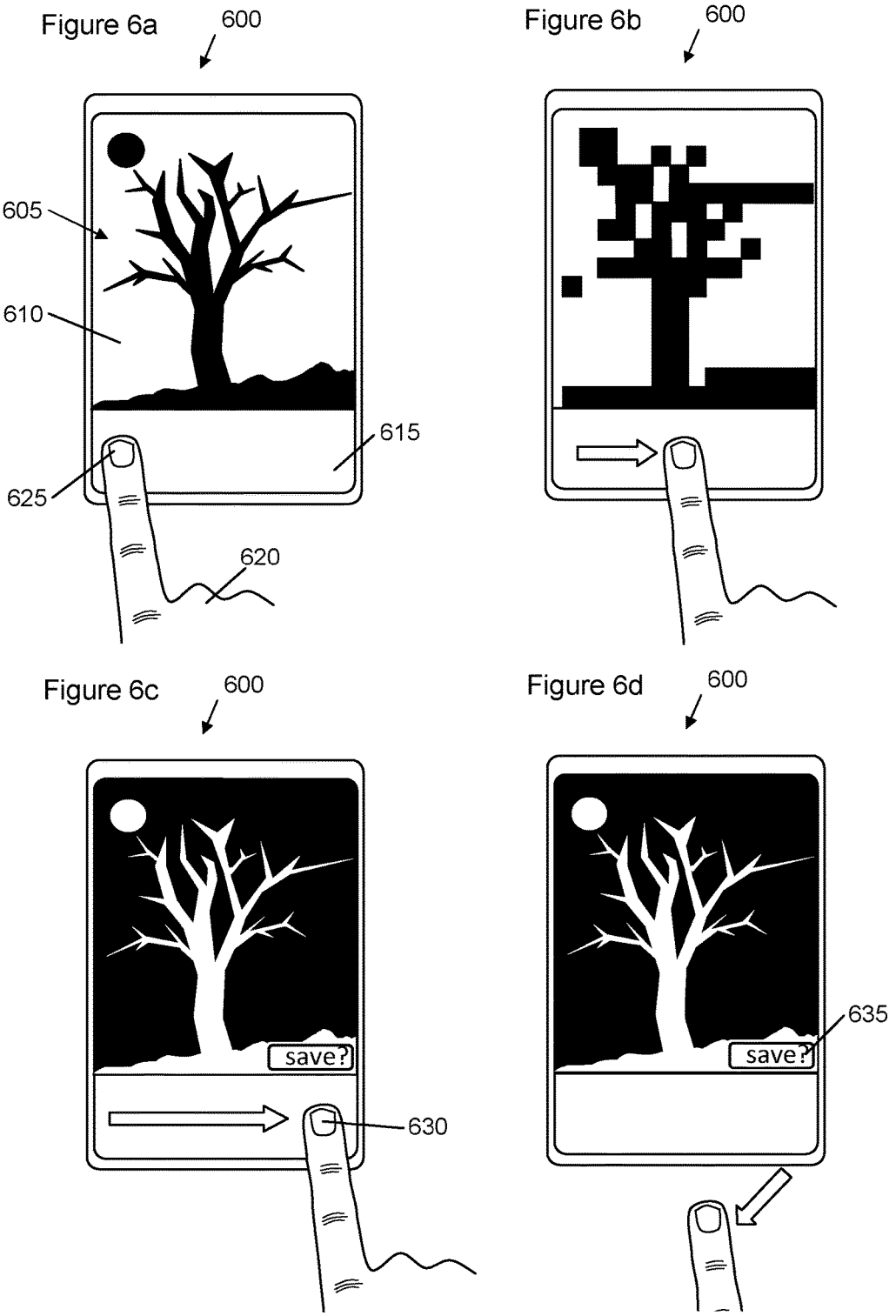

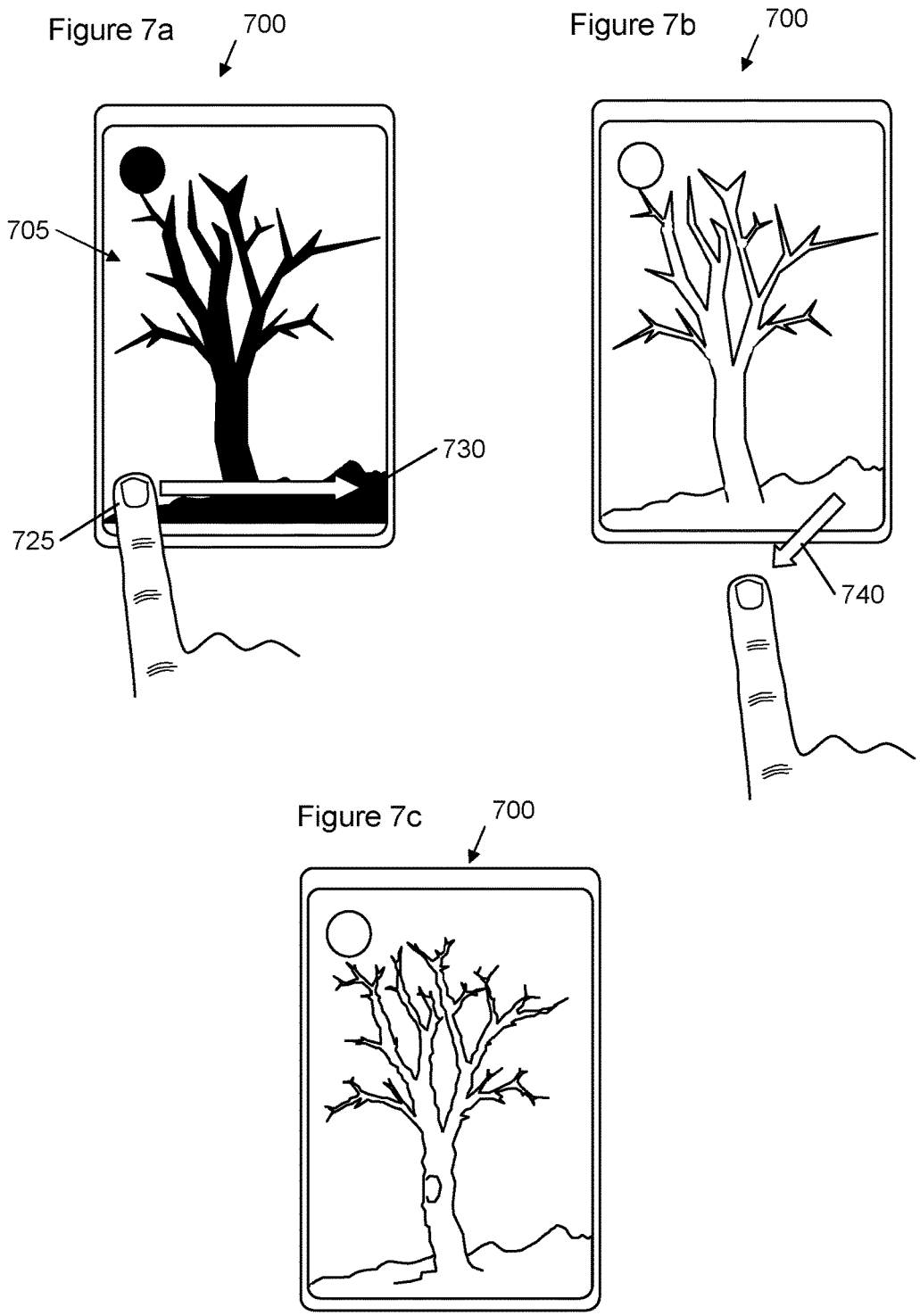

Figure 21
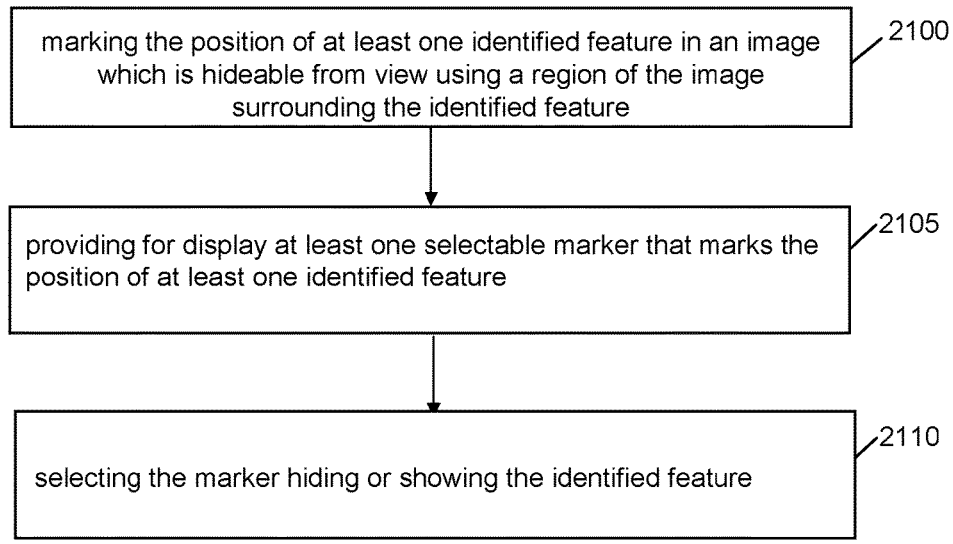
Figure 22a
Figure 22b
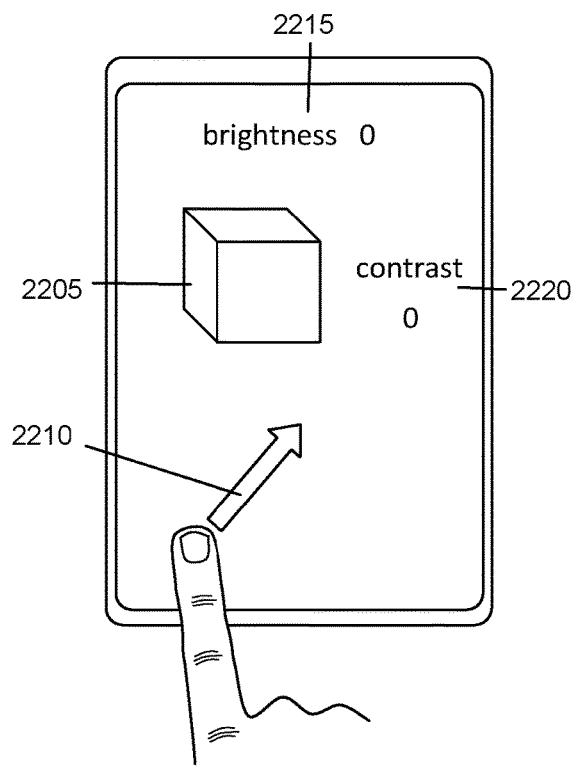
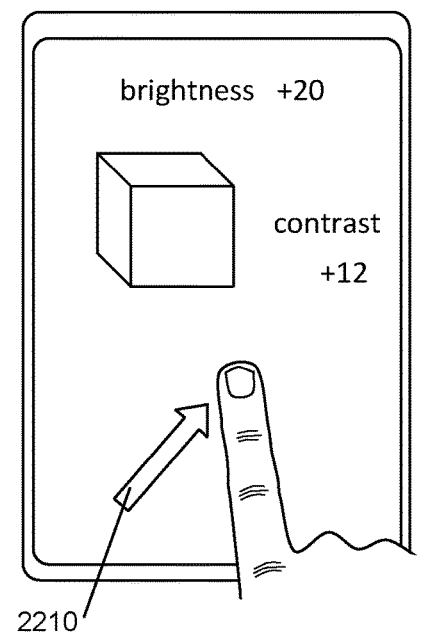

Figure 23
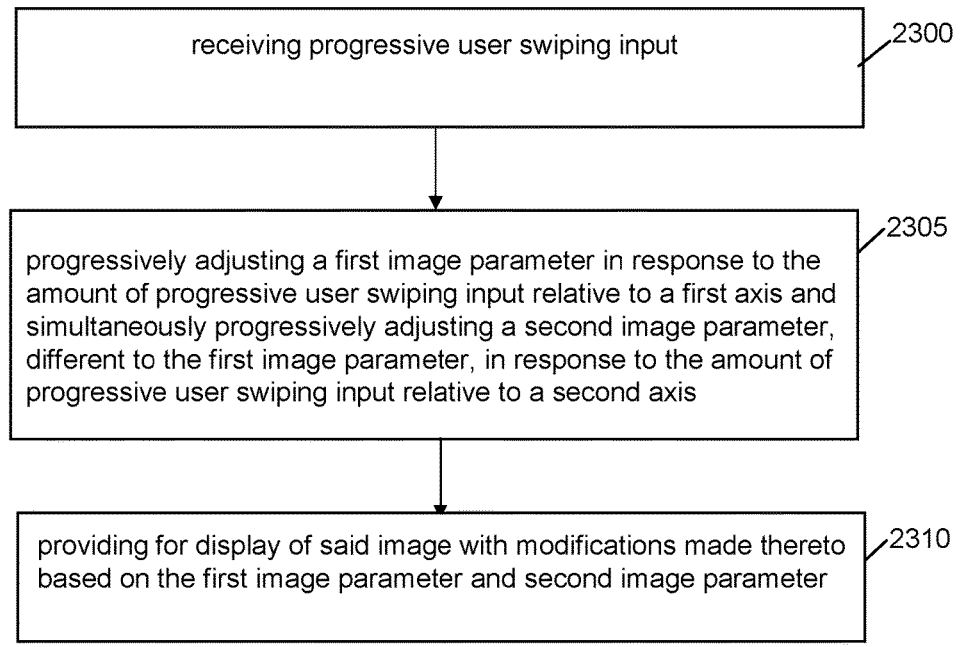
Figure 24a
Figure 24b
Figure 24c
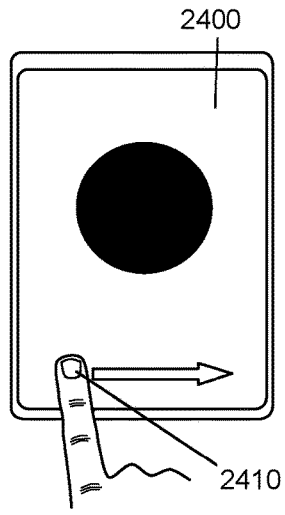
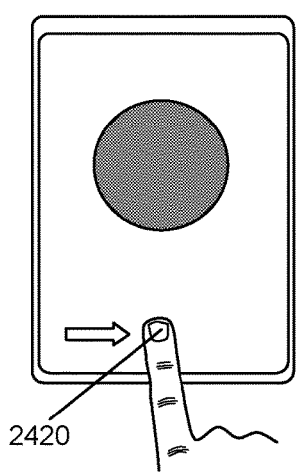
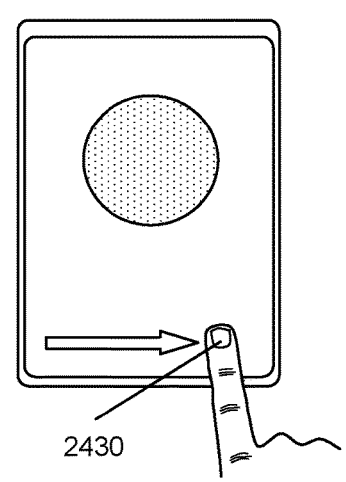

US 10,346,011 B2

USER INTERFACE FOR THE APPLICATION OF IMAGE EFFECTS TO IMAGES

RELATED APPLICATION

This application was originally filed as Patent Cooperation Treaty Application No. PCT/FI2014/050078 filed Jan. 31, 2014, which claims priority benefit to Great Britain Patent Application No. 1302296.7, filed Feb. 8, 2013.

TECHNICAL FIELD

The present disclosure relates to the field of user interfaces and/or image processing, associated methods, computer programs and apparatus. Certain disclosed aspects/examples relate to portable electronic devices, in particular, so-called hand-portable electronic devices which may be hand-held in use (although they may be placed in a cradle in use). Such hand-portable electronic devices include so-called Personal Digital Assistants (PDAs), mobile telephones, smartphones and other smart devices, and tablet PCs.

The portable electronic devices/apparatus according to one or more disclosed aspects/examples may provide one or more audio/text/video communication functions (e.g. tele-communication, video-communication, and/or text transmission (Short Message Service (SMS)/Multimedia Message Service (MMS)/emailing) functions), interactive/non-interactive viewing functions (e.g. web-browsing, navigation, TV/program viewing functions), music recording/playing functions (e.g. MP3 or other format and/or (FM/AM) radio broadcast recording/playing), downloading/sending of data functions, image capture function (e.g. using a (e.g. in-built) digital camera), and gaming functions.

BACKGROUND

The application of image effects to images can assist a user to produce creative images. Images can be manipulated and effects can be applied on a multitude of ways with a multitude of settings. Thus, the application of image effects to an image and/or the manipulation of an image can be time consuming for a user. Further, image effects can take a non-imperceptible time to apply to an image and therefore a user may have to apply and then undo changes to an image several times until they find the image effect and effect parameters that they are happy with or that suits the image.

The listing or discussion of a prior-published document or any background in this specification should not necessarily be taken as an acknowledgement that the document or background is part of the state of the art or is common general knowledge. One or more aspects/examples of the present disclosure may or may not address one or more of the background issues.

SUMMARY

According to an aspect of the invention, we provide an apparatus comprising: at least one processor; and at least one memory including computer program code, the at least one memory and the computer program code configured to, with the at least one processor, cause the apparatus to perform at least the following:

in response to user input selecting a selectable marker, the selectable marker marking the position of at least one identified feature in an image which is hideable from view using a region of the image surrounding the identified feature, hide or show the identified feature.

The selectable marker may comprise a ring or circular ring that surrounds the at least one identified feature.

When a plurality of features are identified, each feature may be marked by a respective selectable marker comprising a ring or circular ring that surrounds the respective feature.

The or each selectable markers may include a plus symbol when the identified feature is hidden in the image and includes a minus symbol when the identified feature is shown in the image.

The plus symbol and minus symbol may be actuatable.

The plus symbol for a marker may allow for the hidden feature to be shown and the minus symbol for a feature may allow for the feature to be hidden.

The apparatus may be configured to initially provide for display of the image without any of the identified features hidden and the selectable markers are initially configured to allow for the hiding of a respective feature in response to said user input selection.

The apparatus may be configured, when two or more features are identified, associate the two or more identified features such that they are treated as a single feature by determining if said two or more identified features satisfy a predefined clustering criterion.

The apparatus may be configured such that said association allows the two or more associated features to be shown or hidden together in response to said user input selection using a single marker marking the position of the associated features.

The mark applied to mark the position of associated features may comprise a ring that surrounds the associated features.

The predefined clustering criterion may be satisfied if the region of the image surrounding the one of the identified features overlaps with the region of the image surrounding the other of the identified features.

The predefined clustering criterion may be satisfied if the two or more identified features are within a predetermined distance of one another.

The predefined clustering criterion may be satisfied if the regions of the image surrounding the two or more identified features are of a hue that falls within a predetermined hue range of one another.

The selectable marker(s) may be displayed partially transparent. The selectable marker(s) may be periodically displayed and not displayed.

The apparatus may be configured to, based on user input, select a save command, save the image to memory with selected features hidden and shown as they were selected on actuation of said save command.

According to a further aspect of the invention, we provide a method comprising;

receiving user input selecting a selectable marker, the selectable marker marking the position of at least one identified feature in an image which is hideable from view using a region of the image surrounding the identified feature, hiding or showing the identified feature in response to said user input.

The selectable marker may comprise a ring or circular ring that surrounds the at least one identified feature. When a plurality of features are identified, each feature may be marked by a respective selectable marker comprising a ring or circular ring that surrounds the respective feature. The or each selectable markers may include a plus symbol when the identified feature is hidden in the image and includes a minus symbol when the identified feature is shown in the image. The plus symbol and minus symbol may be actuatable. The method may include the step of showing the hidden feature on actuation of the plus symbol for a marker and hiding the identified feature on actuation of the minus symbol for a marker.

The method may include the step of providing, initially, for display of the image without any of the identified features hidden and the selectable markers are initially configured to allow for the hiding of a respective feature in response to said user input selection.

The method may include the step of, when two or more features are identified, associating the two or more identified features such that they are treated as a single feature by determining if said two or more identified features satisfy a predefined clustering criterion.

The method may include the step of using a single marker to mark the position of associated features, wherein the association allows the two or more associated features to be shown or hidden together in response to said user input selection.

The mark applied to mark the position of associated features may comprise a ring that surrounds the associated features.

The predefined clustering criterion may be satisfied if the region of the image surrounding the one of the identified features overlaps with the region of the image surrounding the other of the identified features. The predefined clustering criterion may be satisfied if the two or more identified features are within a predetermined distance of one another. The predefined clustering criterion may be satisfied if the regions of the image surrounding the two or more identified features are of a hue that falls within a predetermined hue range of one another.

The selectable marker(s) may be displayed partially transparent. The selectable marker(s) may be periodically displayed and not displayed.

The method may include the step of, based on user input, saving the image to memory with selected features hidden and shown as they were selected on actuation of said save command.

According to a further aspect of the invention, we provide a computer readable medium comprising computer program code stored thereon, the computer readable medium and computer program code being configured to, when run on at least one processor, perform the method of the above aspect.

According to an aspect of the invention, we provide means for, in response to user input selecting a selectable marker, the selectable marker marking the position of at least one identified feature in an image which is hideable from view using a region of the image surrounding the identified feature, hiding or showing the identified feature.

The selectable marker may comprise a ring or circular ring that surrounds the at least one identified feature. Means may be provided for, when a plurality of features are identified, marking each feature by a respective selectable marker comprising a ring or circular ring that surrounds the respective feature. The or each selectable markers may include a plus symbol when the identified feature is hidden in the image and includes a minus symbol when the identified feature is shown in the image. The plus symbol and minus symbol may be actuatable. The plus symbol for a marker may allow for the hidden feature to be shown and the minus symbol for a feature may allow for the feature to be hidden.

The means may be configured to initially provide for display of the image without any of the identified features hidden and the selectable markers are initially configured to allow for the hiding of a respective feature in response to said user input selection.

The means may be configured, when two or more features are identified, associate the two or more identified features such that they are treated as a single feature by determining if said two or more identified features satisfy a predefined clustering criterion.

The means may be configured such that said association allows the two or more associated features to be shown or hidden together in response to said user input selection using a single marker marking the position of the associated features.

The mark applied to mark the position of associated features may comprise a ring that surrounds the associated features.

The predefined clustering criterion may be satisfied if the region of the image surrounding the one of the identified features overlaps with the region of the image surrounding the other of the identified features. The predefined clustering criterion may be satisfied if the two or more identified features are within a predetermined distance of one another. The predefined clustering criterion may be satisfied if the regions of the image surrounding the two or more identified features are of a hue that falls within a predetermined hue range of one another.

The selectable marker(s) may be displayed partially transparent. The selectable marker(s) may be periodically displayed and not displayed.

Means may be provided for, based on user input, saving the image to memory with selected features hidden and shown as they were selected on actuation of said save command.

We disclose an apparatus comprising: at least one processor; and at least one memory including computer program code, the at least one memory and the computer program code configured to, with the at least one processor, cause the apparatus to perform at least the following:
based on received progressive user swiping input, progressively select for application to a displayed image during the received progressive user swiping input, each of a plurality of differential image effect types.

The received user swiping input may comprise user swiping input along a first axis and wherein the apparatus is further configured to provide for the application of a different function based on received user swiping input along a second axis, different to the first axis.

The different function may comprise the selection of an image for display from a plurality of time adjacent images.

The apparatus may be further configured, on termination of the user swiping input, to continue to provide for display the image with the image effect type applied thereto that was last selected prior to the termination of the user swiping input.

The apparatus may be configured to apply the selected image effect type to the image.

The apparatus may be configured to apply the selected image effect type to a lower resolution preview version of a recorded image.

The apparatus may be configured to provide for display a user selectable option that, when selected, applies the selected image effect type to a higher resolution version of the recorded image.

The apparatus may be further configured, on termination of the user swiping input, to apply the image effect type that was last selected prior to the termination of the user swiping input to a higher resolution version of the recorded image.

The plurality of differential image effect types for the image may comprise at least three differential image effect types.

The apparatus may be configured to receive the particular image from a camera module and is configured to perform the steps of the preceding claims on receipt of an image or a plurality of time adjacent images from the camera module.

Selectable image effect types may comprise one or more of the following image effect types: face identification, feature removal, red-eye removal, image pixelization, making the image monochrome, image posterization, fisheye deformation of the image, making the image greyscale, image edge detection and/or colour shift, or any other image effect type.

The different function may comprise adjustment of a parameter associated with the selected image effect type.

The apparatus may be configured to provide for display of the particular image without any of the image effect types applied thereto prior to the input of user swiping input.

The apparatus may be configured, by way of said user swiping input, to select for display the particular image without any of the selectable image effect types applied thereto.

We disclose a method, the method comprising; receiving progressive user swiping input; and progressively selecting for application to a displayed image during the received progressive user swiping input, each of a plurality of differential image effect types.

We disclose a computer readable medium comprising computer program code stored thereon, the computer readable medium and computer program code being configured to, when run on at least one processor, perform the above method.

We disclose an apparatus comprising: at least one processor; and at least one memory including computer program code, the at least one memory and the computer program code configured to, with the at least one processor, cause the apparatus to perform at least the following:
  receive a first object mask representing a moving part of one of a plurality of images comprising a sequence of time adjacent images;
  receive one or more further object masks, formed from respective images of the sequence, representing the moving part in respective different times; and
  use the object masks in a predetermined clutter criterion to determine the displaying of the moving part in a composite image formed from the plurality of time adjacent images.
  The predetermined clutter criterion may comprise;
  determining an overdraw parameter based on an area over which two or more of the object masks overlap;
  determining, based in the overdraw parameter, whether to display the moving part as represented in one of the plurality images in the composite image formed from the plurality of time adjacent images.

The overdraw parameter may be determined using the area over which two or more of the object masks overlap in relation to the area over which the object masks extend.

The predetermined clutter criterion may further comprise;
  determining a coverage parameter based on the area over which the object masks extend;
  determine, based in the coverage parameter, whether to display the moving part as represented in one of the plurality images in the composite image formed from the plurality of time adjacent images.

The coverage parameter may be determined using the area over which the object masks extend in relation to the total area of one of the images.

The apparatus may be configured to apply the clutter criterion incrementally such that the clutter criterion is reapplied each time it is determined that the apparatus should not display the moving part as represented in one of the plurality images in the composite image.

The apparatus may be configured to display the composite image formed after application of the clutter criterion.

The step of determining the displaying of the moving part in a composite image formed from the plurality of time adjacent image may comprise selecting a subset of the plurality of the images in the sequence.

The step of determining the displaying of the moving part in a composite image formed from the plurality of time adjacent image may comprise selecting a subset of the object masks for use in extracting the moving part from the plurality of images in the sequence to assemble a composite image.

We disclose a method, the method comprising;
  receiving a first object mask representing a moving part of one of a plurality of images comprising a sequence of time adjacent images;
  receiving one or more further object masks, formed from respective images of the sequence, representing the moving part in respective different times; and
  using the object masks in a predetermined clutter criterion to determine the displaying of the moving part in a composite image formed from the plurality of time adjacent images.

We disclose a computer readable medium comprising computer program code stored thereon, the computer readable medium and computer program code being configured to, when run on at least one processor, perform the above method.

We disclose an apparatus comprising: at least one processor; and at least one memory including computer program code, the at least one memory and the computer program code configured to, with the at least one processor, cause the apparatus to perform at least the following:
  based on a received user selection of one or more of a plurality of displayed user selectable markers, the user selectable markers each corresponding to one or more of the plurality of time adjacent images in a sequence of images, causing an editing function associated with the one or more images that correspond to the selected marker.

The causing an editing function may comprise adding or removing the one or more images that correspond to the selected marker from a set of selected images which form a composite image from the set of selected images.

Each user selectable marker may correspond to one of the time adjacent images in the sequence of images.

The user selectable markers may be displayed in an order that corresponds to the temporal order of the images in the sequence.

The apparatus may be further configured to provide for display the composite image formed from the set of selected images in response to the addition or removal of the one or more images.

The apparatus may be further configured to, based on user input, select at least one of the user selectable markers as a primary marker, wherein the image corresponding to the selected primary marker is identified as the primary image and the other images in the set of selected images are identified as secondary images, and wherein the apparatus is configured to provide for display of the primary image in the composite image with a different image parameter to the secondary images.

The image parameter may comprise transparency and the primary image is displayed with zero transparency and the secondary images are displayed with non-zero transparency.

Each one of the secondary images may be displayed in the composite image with a non-zero transparency that is determined based on its position in the set of selected images relative to the primary image.

A first secondary image that is temporally closer to the primary image in the set of selected images than a second secondary image, may be provided for display with a lower transparency than the second secondary image.

The apparatus may be configured to include, initially, all of the received time adjacent images in the set of selected images.

The apparatus may include a camera for capturing the plurality of time adjacent images that comprise a sequence of images.

We disclose a method, the method comprising
receiving a user selection of one or more of a plurality of displayed user selectable markers, the user selectable markers each corresponding to one or more of the plurality of time adjacent images in a sequence of images;
causing an editing function associated with the one or more images that correspond to the selected marker, in response to receiving said user selection.

We disclose a computer readable medium comprising computer program code stored thereon, the computer readable medium and computer program code being configured to, when run on at least one processor, perform the above method.

We disclose an apparatus comprising: at least one processor; and at least one memory including computer program code, the at least one memory and the computer program code configured to, with the at least one processor, cause the apparatus to perform at least the following:
based on received progressive user swiping input, progressively adjust a first image parameter in response to the amount of progressive user swiping input relative to a first axis and simultaneously progressively adjust a second image parameter, different to the first image parameter, in response to the amount of progressive user swiping input relative to a second axis; and
provide for display of said image with modifications made thereto based on the first image parameter and second image parameter.

The apparatus may be configured to determine if the amount of user swiping relative to the first axis or second axis is greater than a respective threshold amount and, if it is not greater than the respective threshold amount, no adjustment of the first image parameter or respective second image parameter is effected.

First and second image parameters may be selected from: image brightness, image contrast, image white balance, image saturation, image hue, image highlight level, image low light level, image mid-tone level or any other image parameter.

The apparatus may be configured to provide for progressive display, during said user swiping input, of said image with modifications made thereto using the first and second image parameters.

Said image may comprise a composite image formed from a plurality of time adjacent images and said first image parameter comprises the selection of one of the plurality of time adjacent images as a primary image and said second image parameter comprises a transparency level for application to the time adjacent images.

The second image parameter may not be applied to the selected primary image.

We disclose a method, the method comprising
receiving progressive user swiping input,
progressively adjusting a first image parameter in response to the amount of progressive user swiping input relative to a first axis and simultaneously progressively adjusting a second image parameter, different to the first image parameter, in response to the amount of progressive user swiping input relative to a second axis; and
providing for display of said image with modifications made thereto based on the first image parameter and second image parameter.

We disclose a computer readable medium comprising computer program code stored thereon, the computer readable medium and computer program code being configured to, when run on at least one processor, perform the above method.

We disclose an apparatus comprising:
at least one processor; and at least one memory including computer program code, the at least one memory and the computer program code configured to, with the at least one processor, cause the apparatus to perform at least the following:
progressively adjust a first image parameter of a live image in response to progressive user swiping input; and
provide for display of said live image with progressive modifications made thereto based on progressive adjustment of the first image parameter.

The apparatus may be further configured to
allow user swiping input along a second axis, different to the first axis;
based on user swiping input along a first axis, progressively adjust a first image parameter in response to the amount of user swiping input relative to the first axis and, based on user swiping input along a second axis, different to the first axis, simultaneously
progressively adjust a second image parameter, different to the first image parameter, in response to the amount of user swiping input relative to the second axis; and
progressively display said live image with modifications made thereto based on the first image parameter and second image parameter.

The apparatus may include a camera for capturing said live image.

We disclose a method, the method comprising
receiving progressive user swiping input;
progressively adjusting a first image parameter of a live image in response to said progressive user swiping input; and
providing for display of said live image with progressive modifications made thereto based on progressive adjustment of the first image parameter.

We disclose a computer readable medium comprising computer program code stored thereon, the computer readable medium and computer program code being configured to, when run on at least one processor, perform the above method.

The apparatus in any of the disclosed apparatuses may comprise a portable electronic device, a laptop computer, a mobile phone, a Smartphone, a tablet computer, a personal digital assistant, a digital camera, a watch, a server, or a module/circuitry for one or more of the same.

The apparatus of any of the disclosed apparatuses may comprise a non-portable electronic device, a desktop computer, a monitor, a server, or a module/circuitry for one or more of the same.

The present disclosure includes one or more corresponding aspects, examples or features in isolation or in various combinations whether or not specifically stated (including claimed) in that combination or in isolation. Corresponding means and corresponding functional units (e.g. application loader, journal creation enabler . . . ) for performing one or more of the discussed functions are also within the present disclosure.

Corresponding computer programs for implementing one or more of the methods disclosed are also within the present disclosure and encompassed by one or more of the described examples.

The above summary is intended to be merely exemplary and non-limiting.

BRIEF DESCRIPTION OF THE FIGURES

A description is now given, by way of example only, with reference to the accompanying drawings, in which:

FIG. 3 illustrates another example apparatus

FIG. 4 illustrates an example apparatus having a keyboard

FIG. 5 illustrates an example touch screen device

FIGS. 6a-6d illustrate a first example of a first aspect of the invention

FIGS. 7a-7c illustrates a second example of a first aspect of the invention

FIG. 21 illustrates a flowchart according to a method of the present disclosure;

FIGS. 22a-b illustrate an example of a fifth aspect of the invention

FIG. 23 illustrates a flowchart according to a method of the present disclosure;

FIGS. 24a-c illustrate an example according to a sixth aspect of the invention;

DESCRIPTION OF EXAMPLE ASPECTS

The application of image effects may involve the user making a selection to choose the type of image effect to apply to an image from a menu, waiting for the image to be rendered with the selected effect, and then being presented with options for adjusting a parameter associated with the effect type. For example, the effect type may comprise pixelization of the image and the parameter may be the size of the pixels used in the pixelization. Alternatively, the effect type may be transparency and the parameter may be the level of transparency.

If the user does not like the look of the image once the effect has been applied they typically have to select an "undo" option to return to a previous version of the image. It would be useful for the user to see the result of the application of different effect types to an image quickly and easily. They would then be able to make a quick assessment of which image effect type they wish to apply to the image.

Figure 1:
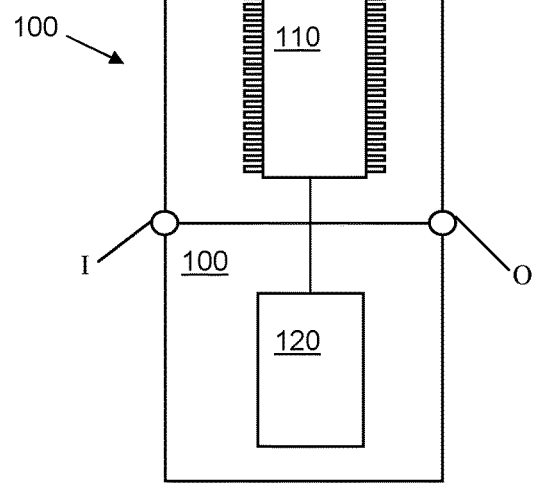
FIG. 1 illustrates an example apparatus according to the present disclosure.

FIG. 1 shows an apparatus 100 comprising a processor 110, memory 120, input I and output O. In this example only one processor and one memory are shown but it will be appreciated that other examples may utilise more than one processor and/or more than one memory (e.g. same or different processor/memory types). The apparatus 100 may be an application specific integrated circuit (ASIC) for a portable electronic device. The apparatus 100 may also be a module for a device, or may be the device itself, wherein the processor 110 is a general purpose CPU and the memory 120 is general purpose memory.

The input I allows for receipt of signalling to the apparatus 100 from further components. The output O allows for onward provision of signalling from the apparatus 100 to further components. In this example the input I and output O are part of a connection bus that allows for connection of the apparatus 100 to further components. The processor 110 is a general purpose processor dedicated to executing/processing information received via the input I in accordance with instructions stored in the form of computer program code on the memory 120. The output signalling generated by such operations from the processor 110 is provided onwards to further components via the output O.

The memory 120 (not necessarily a single memory unit) is a computer readable medium (such as solid state memory, a hard drive, ROM, RAM, Flash or other memory) that stores computer program code. This computer program code stores instructions that are executable by the processor 110, when the program code is run on the processor 110. The internal connections between the memory 120 and the processor 110 can be understood to provide active coupling between the processor 110 and the memory 120 to allow the processor 110 to access the computer program code stored on the memory 120.

In this example the input I, output O, processor 110 and memory 120 are electrically connected internally to allow for communication between the respective components I, O, 110, 120, which in this example are located proximate to one another as an ASIC. In this way the components I, O, 110, 120 may be integrated in a single chip/circuit for installation in an electronic device. In other examples one or more or all of the components may be located separately (for example, throughout a portable electronic device such as devices 200, 300, or through a "cloud", and/or may provide/support other functionality.

Figure 2:
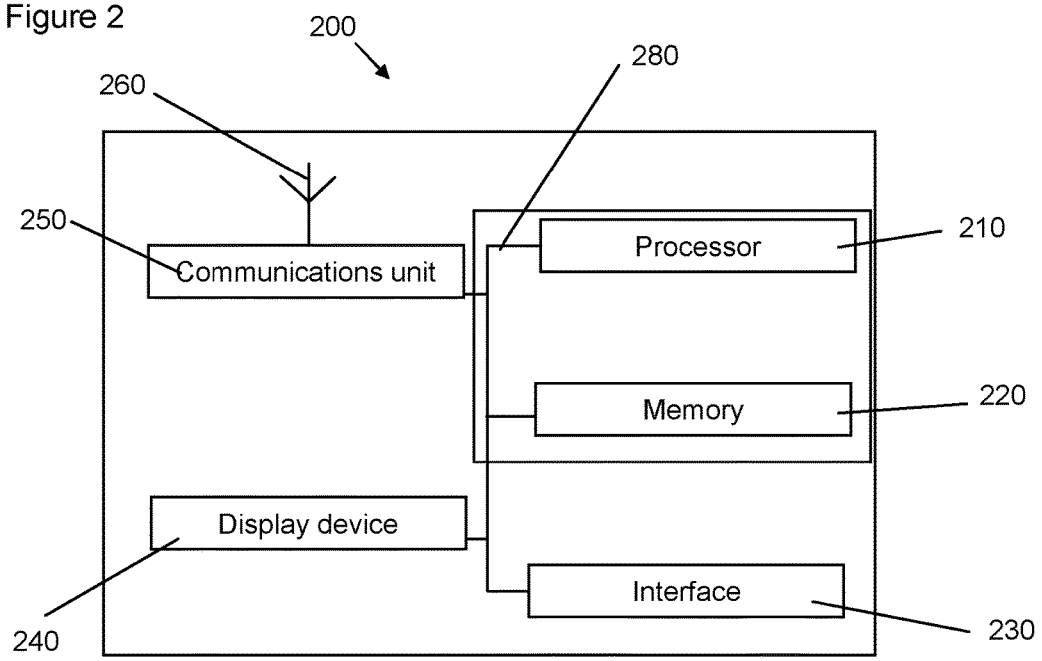
FIG. 2 illustrates another example apparatus

One or more examples of the apparatus 100 can be used as a component for another apparatus as in FIG. 2, which shows a variation of apparatus 100 incorporating the functionality of apparatus 100 over separate components. In other examples the device 200 may comprise apparatus 100 as a module (shown by the optional dashed line box) for a mobile phone or PDA or audio/video player or the like. Such a module, apparatus or device may just comprise a suitably configured memory and processor.

The example apparatus/device 200 comprises a display 240 such as a Liquid Crystal Display (LCD), e-Ink, or touch-screen user interface. The device 200 is configured such that it may receive, include, and/or otherwise access data. For example, device 200 comprises a communications unit 250 (such as a receiver, transmitter, and/or transceiver), in communication with an antenna 260 for connection to a wireless network and/or a port (not shown). Device 200 comprises a memory 220 for storing data, which may be received via antenna 260 or user interface 230. The processor 210 may receive data from the user interface 230, from the memory 220, or from the communication unit 250. Data may be output to a user of device 200 via the display device 240, and/or any other output devices provided with apparatus. The processor 210 may also store the data for later user in the memory 220. The device contains components connected via communications bus 280.

The communications unit 250 can be, for example, a receiver, transmitter, and/or transceiver, that is in communication with an antenna 260 for connecting to a wireless network and/or a port (not shown) for accepting a physical connection to a network, such that data may be received via one or more types of network. The communications (or data) bus 280 may provide active coupling between the processor 210 and the memory (or storage medium) 220 to allow the processor 210 to access the computer program code stored on the memory 220.

The memory 220 comprises computer program code in the same way as the memory 120 of apparatus 100, but may also comprise other data. The processor 210 may receive data from the user interface 230, from the memory 220, or from the communication unit 250. Regardless of the origin of the data, these data may be outputted to a user of device 200 via the display device 240, and/or any other output devices provided with apparatus. The processor 210 may also store the data for later user in the memory 220.

Device/apparatus 300 may be an electronic device (including a tablet personal computer), a portable electronic device, a portable telecommunications device, or a module for such a device. The apparatus 100 can be provided as a module for device 300, or even as a processor/memory for the device 300 or a processor/memory for a module for such a device 300. The device 300 comprises a processor 385 and a storage medium 390, which are electrically connected by a data bus 380. This data bus 380 can provide an active coupling between the processor 385 and the storage medium 390 to allow the processor 385 to access the computer program code.

The apparatus 100 in FIG. 3 is electrically connected to an input/output interface 370 that receives the output from the apparatus 100 and transmits this to the device 300 via data bus 380. Interface 370 can be connected via the data bus 380 to a display 375 (touch-sensitive or otherwise) that provides information from the apparatus 100 to a user. Display 375 can be part of the device 300 or can be separate. The device 300 also comprises a processor 385 that is configured for general control of the apparatus 100 as well as the device 300 by providing signalling to, and receiving signalling from, other device components to manage their operation.

The storage medium 390 is configured to store computer code configured to perform, control or enable the operation of the apparatus 100. The storage medium 390 may be configured to store settings for the other device components. The processor 385 may access the storage medium 390 to retrieve the component settings in order to manage the operation of the other device components. The storage medium 390 may be a temporary storage medium such as a volatile random access memory. The storage medium 390 may also be a permanent storage medium such as a hard disk drive, a flash memory, or a non-volatile random access memory. The storage medium 390 could be composed of different combinations of the same or different memory types.

FIGS. 4 and 5 illustrate examples of the apparatus which is a portable electronic device 400, 500 such as a smartphone or PDA, in use. The device 400 in this example includes a keyboard for receiving user input. The device 500 includes a touch screen display for receiving user input. In particular, the device 500 provides user selectable icons and other manipulatable graphics that allow a user to touch an area of the screen associated with the icon or graphic to actuate it. The device 500 may change the appearance or position of the icons or graphics in response to the user input, as will be known to those in the art. Further, the device 500 is receptive to gestures, such as swipes across the screen, the tracing of paths along the surface, contact with the screen and removal of contact with the screen, which can be configured to provide different user input.

The exemplary embodiments described herein will be referred to as being performed by a processor of a mobile device having a touch screen input, but it will be appreciated that the embodiments could be performed using any of the apparatus, processors, modules or devices shown in FIGS. 1 to 5. Also, in other embodiments, one or more of the described aspects may be performed using input via a peripheral device, eg a mouse, and not necessarily via a touch screen. In the case of input via a peripheral device such as a mouse it will be appreciated that the progressive user swiping comprises translational/lateral (linear, curved or otherwise) movement of the mouse during a selection actuation.

FIGS. 6a to 6d shows a mobile device 600 having a processor and memory and a touch screen display 605 for receiving user input. The processor is configured to provide a plurality of image effect types for applying to an image. In this embodiment three image effect types are available for selection. It will be appreciated that 4, 5, 6, 7, 8, 9, 10, or more image effect types may be provided for selection. The three differential image effect types available comprise a monochrome effect type, a pixelated effect type and a negative effect type.

In this example the mobile device 600 includes a camera (not visible) that has been used to take a photograph of a tree. The image from the camera is recorded in memory at a native resolution of the camera. In FIG. 6a the user has entered an image effect type preview mode. In this mode, the processor is configured to provide an image region 610 and a user input region 615 for a user to use in providing user input to the device 600. In the image effect type preview mode, a lower resolution version of the recorded image is displayed in the image region 610. The first of the three image effect types is selected by default and applied by the processor to the lower resolution version of the image displayed in image region 610. In this embodiment, as shown in FIG. 6a, the first image effect type is a monochrome effect type. Accordingly, the lower resolution version of the recorded image is converted from its original colour form to a monochrome form and displayed by the processor.

In FIG. 6a, the user 620 places their finger on the user input region 615. FIGS. 6a to 6c show the result of the user progressively swiping their finger across the user input region 615 from a first point 625 to a second point 630. It will be appreciated that progressive user swiping comprises translational/lateral (linear, curved or otherwise) movement of user's finger (or stylus/peripheral device or touch screen input tool) while in contact with the touch screen input region 715. In the case of input via a peripheral device such as a mouse it will be appreciated that the progressive user swiping comprises translational/lateral (linear, curved or otherwise) movement of the mouse during a selection actuation.

FIG. 6b shows the user's progressive swiping input reaching a point on the user input region 615 between points 625 and 630. At this point the processor selects a second of the three image effect types. In this instance, the second image effect type comprises the pixelated effect type. Accordingly, the processor stops applying the initially applied monochrome effect type and applies the pixelated effect type to the lower resolution version of the image. Accordingly, the lower resolution version of the recorded image is converted to a pixelated form and displayed by the processor in the image region 610 during the user's progressive swiping input.

FIG. 6c shows the user's progressive swiping input reaching the second point 630. At this point the processor selects a third of the three image effect types. In this instance, the third image effect type comprises the negative effect type. Accordingly, the processor stops applying the pixelated effect type and applies the negative effect type to the lower resolution version of the image. Accordingly, the lower resolution version of the recorded image is converted to a negative form and displayed by the processor in the image region 710 during the user's progressive swiping input.

At point 630 the user terminates the progressive swiping input by removing their finger as shown in FIG. 6d from the user input region 615. The processor continues to display the last selected (in this instance third image effect type) applied to the lower resolution version of the recorded image. The user can then select whether they wish to apply the selected image effect type at a higher resolution. This may be achieved by the user tapping the image region 610 of the display. However, in this embodiment the processor displays a selectable option 635 which may have an informative icon or description to identify its function to a user, such as "Save?". On actuation of the selectable option by the user touching the screen 605 over the displayed selectable option 635, the processor applies the selected image effect type to the recorded image and displays the resulting image to the user. The processor may also save a modified version of the recorded image in the memory or overwrite the recorded image.

Rather than select the selectable option the user may decide to return to a previously applied effect. Accordingly the user can again contact the input region 615 and progressive scroll back to point 625 and the processor is configured to progressively select the second and then the first image effect types and display the lower resolution version of the image with the selected effect types applied as they are selected. On termination of this second progressive swiping input, the processor may again display the selectable option 635 so that the user can choose to apply the selected (first, monochrome image effect type) effect to the recorded image.

FIG. 7a-7c shows a second embodiment in which the image region 730 covers the whole display 705. This embodiment does not utilize a user input region and instead user input is received by user input applied at any point on the display 705. The processor is configured to display a low resolution version of the recorded image in the image effect preview mode shown in FIGS. 7a to 7c. In this embodiment, the progressive selection of image effect types by progressive user swiping input is similar to the previous embodiment. However, in this embodiment, the processor is configured to cycle through and select the three image effect types more than once during a progressive user swiping input from point 725 to point 730. Thus, a shorter movement by the user that forms part of the swiping input causes the processor to select the next image effect type. For example, in moving from point 725 to point 730, the processor may select the first image effect type, followed by the second, then the third and then switching back to the first, then to the second again and then to the third by the time the progressive user swiping input reaches point 730. It will be appreciated that different switching scales, i.e. the distance moved during the user swiping input that will cause the processor switch between the image effect types, may be used for the progressive user swiping input. Again, like in the previous embodiment, the processor progressively displays the selected effect applied to a lower resolution "preview" version of the recorded image.

In the second embodiment four image effect types are provided, namely, outline effect, red-eye removal, saturation boost and face detection tagging. FIG. 7a shows the device 700 in the image effect type preview mode as a user places their finger on the display at the point 725 to begin a user swiping input. In this embodiment the processor does not initially apply one of the four image effect types to the lower resolution version of the image for display. Instead, it displays a lower resolution version of the image without any of the image effects types applied.

FIG. 7b shows the user having moved their finger to a point that causes the processor to select the first image effect type, namely the outline effect type. Accordingly, a lower resolution preview is displayed when the first effect is selected during the user input swiping. The user has decided that they like the outline effect and have accordingly terminated the swiping input by lifting their finger from the display as shown by arrow 740. In this embodiment, the processor is configured to detect the termination of the swiping input and then automatically display the selected image effect type (in this example the first, outline effect) applied to a higher resolution version of the image. FIG. 7c shows the display of a higher resolution version of the image with the outline effect applied. The user did not choose to continue the progressive swiping input to progressively view the red-eye removal, saturation boost and face detection tagging effect types.

Figure 8A:
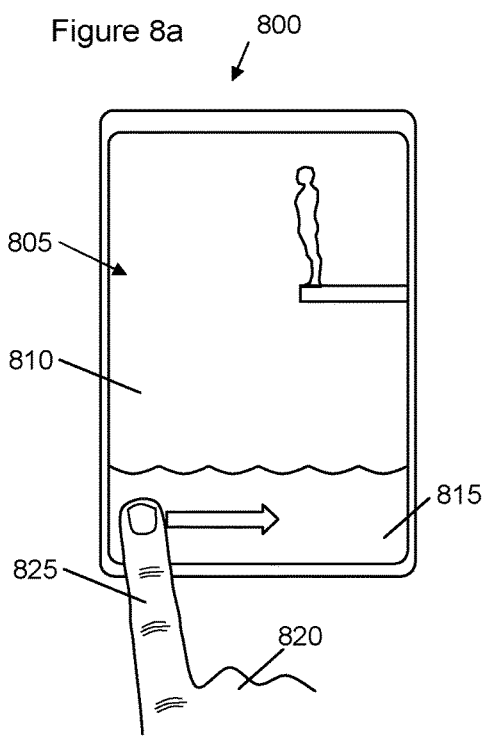
FIGS. 8a-8d illustrates a third example of a first aspect of the invention
Figure 8B:
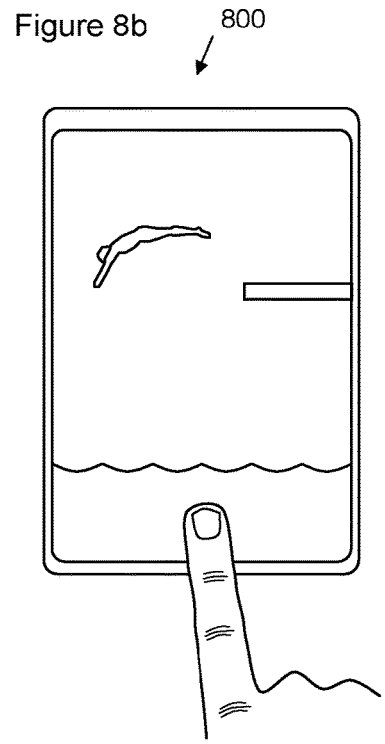
Figure 8C:
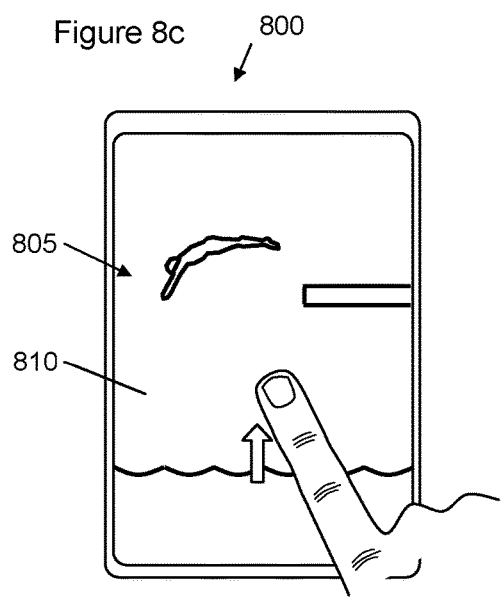

In a third embodiment, shown in FIGS. 8a to 8c, the image is a burst image, which comprises a plurality of time adjacent images taken in succession to form a sequence of images. Burst images are typically used to capture movement. This embodiment operates in a similar manner to the second embodiment. However, the processor is configured to differentiate between user swiping input in a first direction and user swiping input in a second direction. In this instance, the first direction is a horizontal direction and the second direction is a vertical direction with respect to the display 805. FIGS. 8a and 8b show a user swiping input in the first direction. The processor is configured to progressively select the images that make up the sequence of images for display. Thus, FIG. 8a shows the first image in the sequence of images in which a diver is standing on a diving board. Progressive swiping user input in the horizontal direction to the point in FIG. 8b has caused the processor to progressively select and display the second image in the sequence, followed by the third image in the sequence and now the fourth image in the sequence, as shown in FIG. 8b. In the fourth image, shown in FIG. 8b, the diver has jumped up from the diving board and is starting their descent to the pool.

Figure 8D:
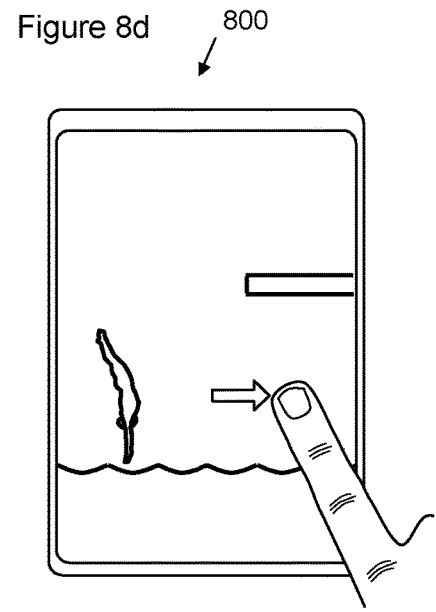

The user decides that they like this fourth image in the sequence and would like to preview an image effect type applied thereto. Thus, as shown in FIG. 8c, the user continues to provide user swiping input but now in a vertical direction. The processor is configured to cycle through the image effect types, as discussed in previous embodiments, and progressively apply those effects to the selected fourth image in the sequence for display. In FIG. 8c the user has paused the user swiping input with a sixth image effect type out of a possible ten image effect types selected. Accordingly the lower resolution preview is displayed following the display of the previously selected five image effect types. The sixth image effect type comprises an edge enhance image effect. The user may decide that they like this image effect type but would prefer that it was applied to an image four images further along in the sequence of images. Accordingly, the processor is configured, on further user swiping input in the first direction, to progressively select and display the fifth image in the sequence with the edge enhance image effect applied thereto, then the sixth image in the sequence with the edge enhance image effect applied thereto and so on until the progressive user swiping input causes the processor to select and display the ninth image with the selected sixth image effect type applied, as shown in FIG. 8d.

Figure 9:
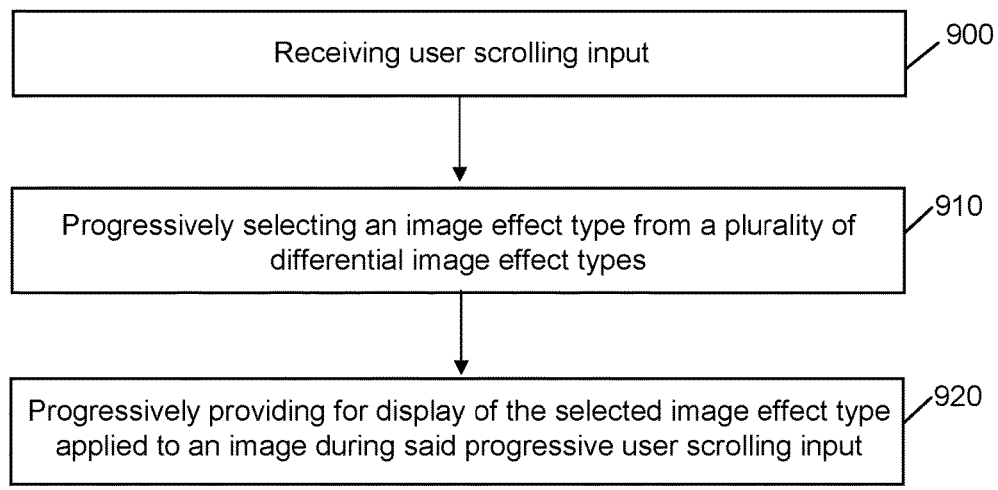
FIG. 9 illustrates a flowchart according to a method of the present disclosure.

FIG. 9 shows a flow diagram illustrating the steps of receiving user swiping input 900, progressively selecting an image effect type from a plurality of differential image effect types 910, progressively providing for display of the selected image effect type applied to an image during said progressive user swiping input 920 and is self-explanatory.

FIGS. 10 to 14 shows an embodiment of a second aspect of the invention. As discussed above a burst image comprises a plurality of time adjacent images that form a sequence of images. Typically, a camera will have a mode to take a plurality of images in succession which can show how a moving object moves through the captured scene over the plurality of images. A composite image can be formed by combining the plurality of images in the sequence into a single image, perhaps by superimposing, blending or overlaying each image on top of one another.

Composite images can appear to be cluttered, especially when there is little difference between the images in the sequence. This may be due to the moving object in the scene moving relatively slowly or could be because the camera captures the sequence of images very quickly.

It would be advantageous if composite images could be formed that are not cluttered and therefore depict the movement of a moving object in the scene more clearly. The following embodiment comprises an example of how the sequence of images can be processed to form an uncluttered composite image.

Figure 10A:
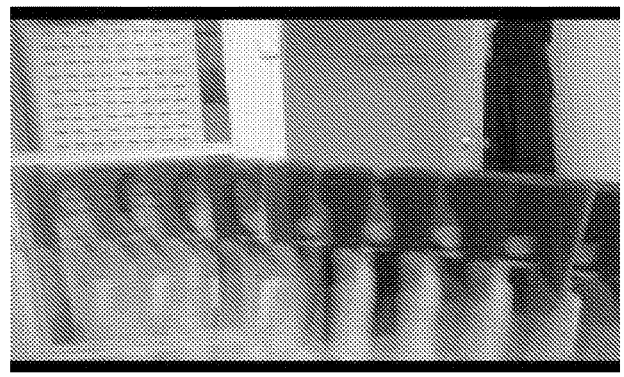
FIGS. 10a-10b shows an example of a cluttered and uncluttered image
Figure 10B:

FIG. 10a shows a composite image that is cluttered due to the overlapping of its component images from the sequence of images. FIG. 10b shows a composite image formed from a subset of the sequence of images that results in an uncluttered composite image.

In a first embodiment, an apparatus, which may be a mobile device or any other apparatus as discussed above, includes a camera that is adapted to capture a plurality of time adjacent images that form a sequence of images. A processor of the apparatus is configured to analyse the plurality of images to determine how a composite image is formed from the sequence of images.

In summary, the processor is configured to receive a plurality of images that form a sequence of images, assess the plurality of images using a clutter criterion, if the clutter criterion is not met, form a subset of the plurality of images and then provide for display of a composite image formed from the subset of images.

In particular, a moving part of the sequence of images is identified using a moving parts detection and background extraction algorithm, such as using the median image to detect the background, and then use the colour and intensity distance from the background image to identify moving parts. The skilled man will be familiar with such an algorithm and therefore it will not be discussed here in more detail. A moving part of the sequence of images comprises a feature common to two or more of the plurality of images that changes its shape and/or position in the scene over the two or more images.

The algorithm returns an object mask comprising an area in the images where the moving object is present. The algorithm produces an object mask for each of the plurality of images in which the moving object is present.

Figure 11A:
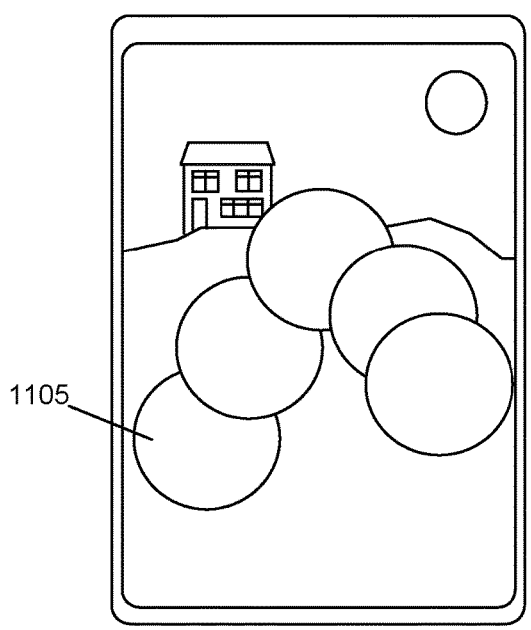
FIGS. 11-13 illustrate an example of a second aspect of the invention

In FIG. 11a an example image is shown that is considered to be cluttered. The composite image is formed from five component images that form a sequence of images. The sequence of images have captured the movement of a ball following a curved path from the bottom left corner of the first image of the sequence of images to the top middle region by the third image of the sequence of images and then down to the bottom right corner of the image by the fifth and final image in the sequence of images.

Figure 12A:
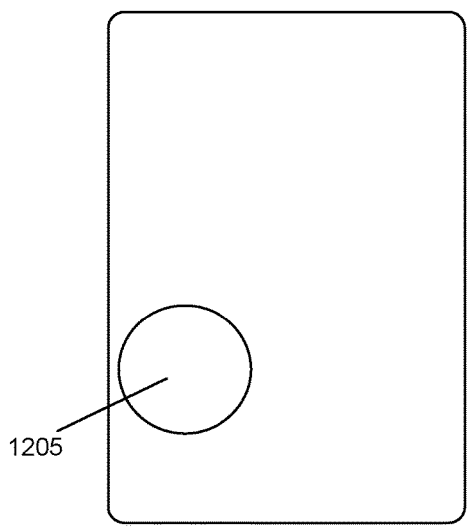
Figure 12B:
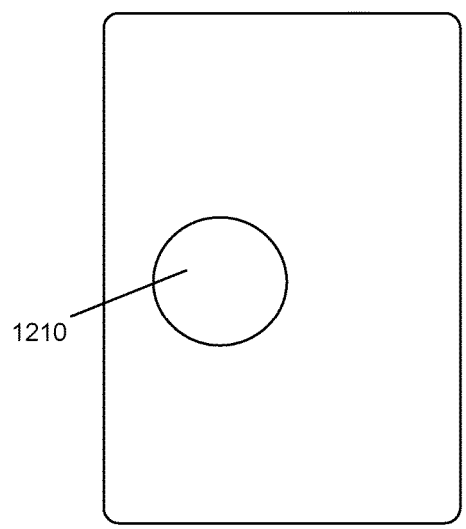
Figure 13A:
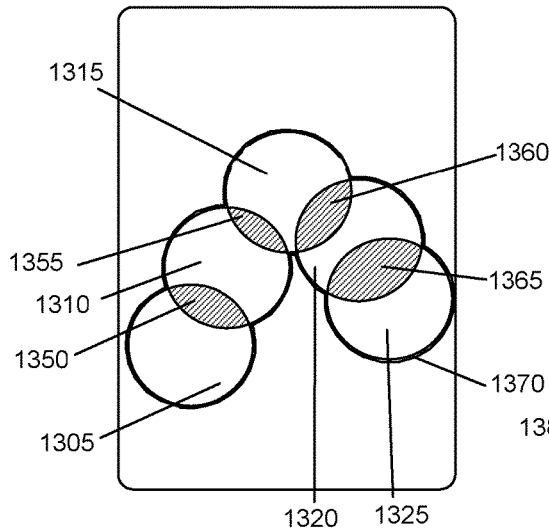
Figure 13B:
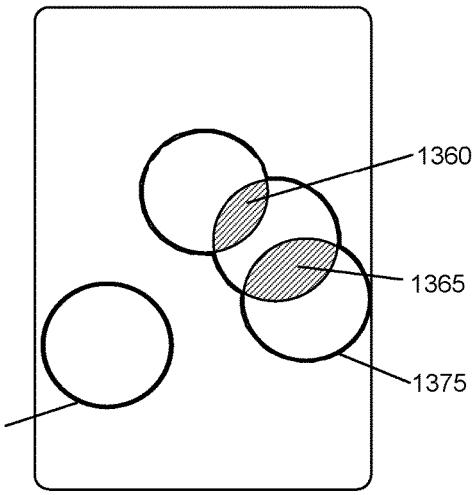

The algorithm is able to identify the ball as comprising a moving object over the plurality of images. The algorithm returns a first object mask for the first image in the sequence that comprises an area that defines the position of the ball in the first image. A depiction of the first object mask 1205 is shown in FIG. 12a. Likewise, the algorithm returns a second object mask for the second image in the sequence that comprises an area that defines the position of the identified moving object (the ball) in the second image. A depiction of the second object mask 1210 is shown in FIG. 12b. The algorithm returns a third object mask for moving object identified in the third image and so on for each of the images in the sequence in which the moving object can be identified.

The processor is configured to use the object masks with a clutter criterion that is used to determine how the plurality of images are used in the construction of a composite image.

In this embodiment, the clutter criterion considers a measure of the overlap between the object masks and a measure of the coverage area covered by the object masks. In a second embodiment, the clutter criterion only considers the measure of overlap. In a third embodiment, the clutter criterion only considers the measure of coverage area.

The measure of overlap is determined by calculation of an overdraw parameter. The overdraw parameter comprises a ratio of the total area covered by overlapping portions of all of the object masks to the total area covered by the object masks. The area 1350 is a region where the first object mask 1305 overlaps with the second object mask 1310. The area 1355 is a region where the second object mask 1310 overlaps with the third object mask 1315. The area 1360 is a region where the third object mask 1315 overlaps with the fourth object mask 1320. The area 1365 is a region where the fourth object mask 1320 overlaps with the fifth object mask 1325. The sum of the areas 1355, 1360, 1365, 1370 comprises the total overlapping area. The total area over which the object masks extend (without counting any area within overlapping areas more than once) comprises the total mask area. Thus, the total mask area comprises the area represented by the dashed line 1370. The overdraw parameter is calculated using a ratio of the total overlapping area to the total mask area.

To determine whether this part of the clutter criterion is satisfied the overdraw parameter is compared to a predefined overdraw threshold. In this embodiment, the overdraw threshold is set at 0.5, although it will be appreciated that other values could be used or the overdraw threshold could be user adjustable. If the overdraw parameter is greater than the overdraw threshold then this part of the clutter criterion is not satisfied. If the overdraw parameter is less than or equal to the overdraw threshold then this part of the clutter criterion is satisfied.

The measure of the area covered by the object masks is determined by calculation of a coverage parameter. The coverage parameter comprises a ratio of the total mask area to the total area of one of the images in the sequence of images.

To determine whether this part of the clutter criterion is satisfied the coverage parameter is compared to a predefined coverage threshold. In this embodiment, the coverage threshold is set at 0.5, although it will be appreciated that other values could be used or the coverage threshold could be user adjustable. If the coverage parameter is greater than the coverage threshold then this part of the clutter criterion is not satisfied. If the coverage parameter is less than or equal to the coverage threshold then this part of the clutter criterion is satisfied.

If both the measure of overlap and measure of coverage is less than or equal to their respective thresholds then the clutter criterion is satisfied and all of the plurality images in the sequence are used to form the composite image. The processor displays the composite image.

Figure 11B:
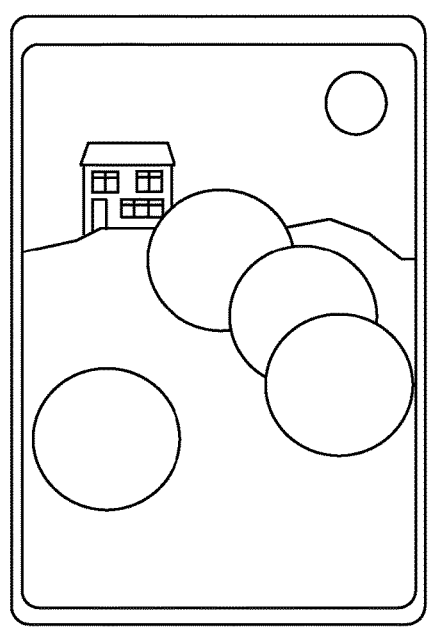

If either or both of the measure of overlap and measure of coverage is greater than their respective thresholds the clutter criterion is not satisfied. In this instance, a subset of the plurality of images in the sequence is formed. In this embodiment the subset is formed by the removal of one of the images in the sequence. The image that is removed is chosen at random (although other methods could be employed to select which image or images are not included in the subset). FIG. 11b shows the second image in the sequence of images has not been included in a first subset.

Figure 11C:
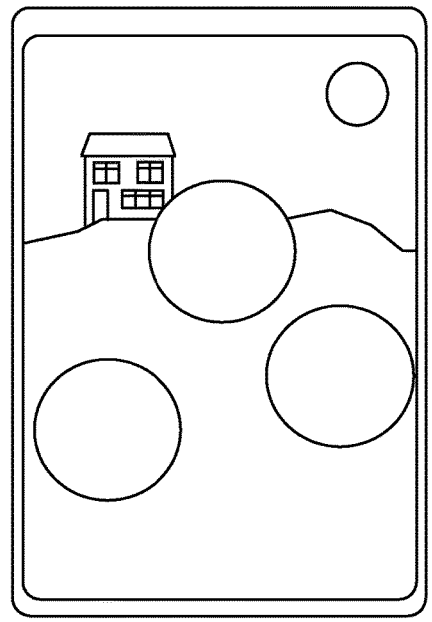

The clutter criterion is then reassessed using only the object masks associated with the subset of images. Accordingly, the total overlapping area now comprises the total of areas 1360 and 1365. The total mask area comprises the area 1375 plus the area 1380 shown by the dashed lines In this example, the clutter criterion is still not satisfied. Accordingly, a further subset is formed that includes fewer of the plurality of images than the previous, first subset. FIG. 11c shows that the fourth image in the sequence has not been included in the further subset. The further subset therefore comprises the first, third and fifth images of the sequence of images.

The clutter criterion is then reassessed using only the object masks associated with the further subset of images. Accordingly, the total overlapping area is now zero. The total mask area comprises the area of the first object mask 1305 plus the area of the third object mask 1315 plus the area of the fifth object mask 1325.

The clutter criterion is now satisfied as the overdraw parameter is not greater than the overdraw threshold and the coverage parameter is not greater than the coverage threshold. The processor then provides for display of a composite image formed using the images of the further subset. FIG. 11c shows the resulting composite image which is formed from the first, third and fifth images in the sequence of images.

In a further embodiment, the apparatus may start by forming a subset of two of the images in the sequence of images. The processor then receives the object masks from the algorithm. The clutter criterion is then applied and, if it is satisfied, an image from the sequence of images is added to the subset. The clutter criterion is then reapplied to the larger subset. This method iteratively builds up a set of images from a sequence of images until the clutter criterion is no longer satisfied. It then provides for display of a composite image using the last subset of images that satisfied the clutter criterion. This is in contrast to the previous method, which started with all of the images in the sequence and iteratively removed images from a working set until the clutter criterion was met.

Figure 14:
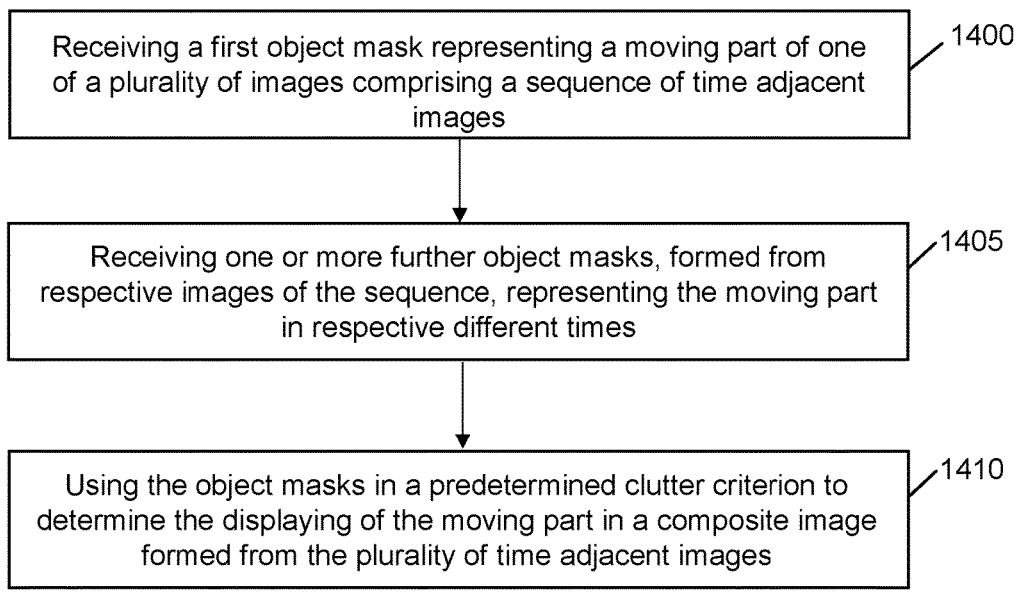
FIG. 14 illustrates a flowchart according to a method of the present disclosure.

FIG. 14 shows a flow diagram illustrating the steps of receiving a first object mask representing a moving part of one of a plurality of images comprising a sequence of time adjacent images 1400, receiving one or more further object masks, formed from respective images of the sequence, representing the moving part in respective different times 1405, and using the object masks in a predetermined clutter criterion to determine the displaying of the moving part in a composite image formed from the plurality of time adjacent images 1410 and is self-explanatory.

Figure 15A:
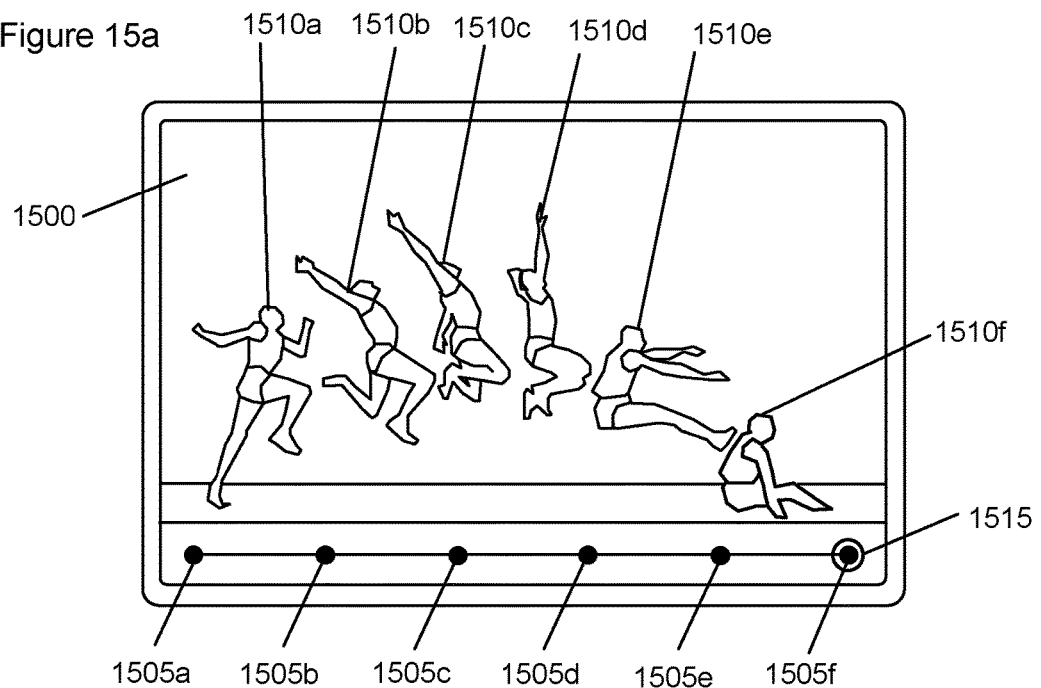
FIGS. 15a and 15b illustrate an example of the invention
Figure 15B:
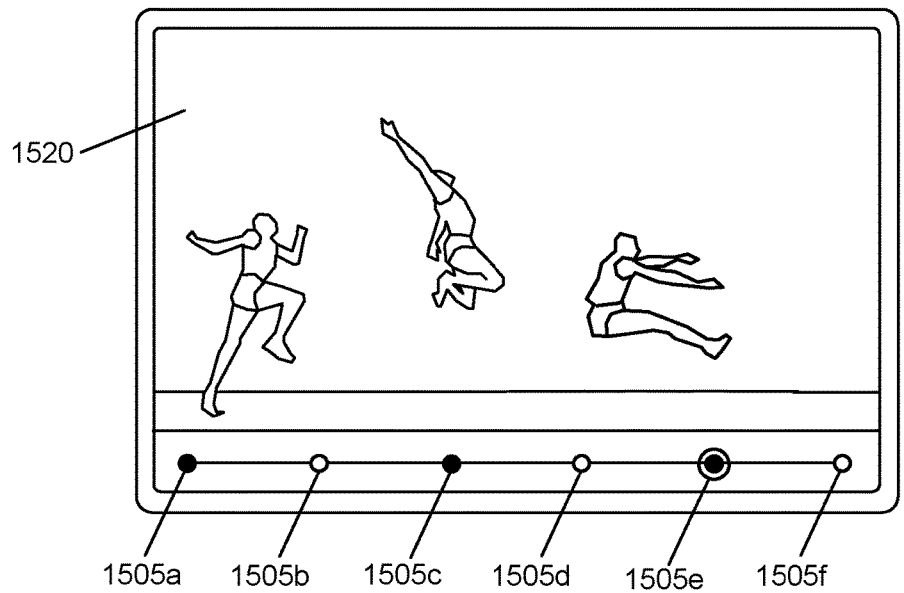

FIGS. 15a and 15b show a first embodiment of a third aspect of the invention. As discussed above, a burst image comprises a plurality of time adjacent images that form a sequence of images. Typically, a camera will have a mode to take a plurality of images in succession which can show how a moving object moves through the captured scene over the plurality of images. Thus, the path or other changes of a moving object are captured in a series of still images. A composite image can be formed by combining the plurality of images in the sequence into a single image, perhaps by superimposing, blending or overlaying each image on top of one another. The moving object then appears in each of its shapes/positions in a single image to give the impression of movement in a still image.

Composite images can appear to be cluttered, especially when there is little difference between the images in the sequence. This may be due to the moving object in the scene moving relatively slowly or could be because the camera captures the sequence of images very quickly. Further, the style of a composite image can be changed by the number and degree of movement of a moving object in the scene between component images.

It would be advantageous if composite images could be formed easily from selected images from a sequence of images. The following embodiment comprises an example of an apparatus for easy selection of the component images that form a composite image.

A device having a processor and a camera may capture a burst mode image comprising a plurality of images in sequence. Alternatively, the plurality of images may be stored or taken at an earlier time. The processor is configured to assemble the plurality of images into a composite image. FIG. 15a shows such a composite image 1500, formed from six images taken in quick succession of a person performing the long jump at an athletics event. The six component images thus show the person in various positions during their take-off, flight through the air and landing as well as in different shapes as they move their body during each phase. It will be appreciated that any number of images could be present in the sequence of images captured in the burst mode.

In FIG. 15a, all of the captured images (six) are used to form the composite image 1500. The processor displays a plurality of selectable markers 1505. The processor is configured to display a selectable marker 1505a, 1505b, 1505c, 1505d, 1505e and 1505f for each image in the sequence of images. The processor is configured to associate each of the selectable markers with one of the images that form the composite image. Further, the processor is able to determine the temporal order of the sequence of images by using a time stamp or index number stored in metadata associated with each of the plurality of images. The association between the selectable markers and the images is therefore ordered such that the order in which the selectable markers are presented corresponds to the temporal order of the images. The selectable markers are presented in a longitudinal strip along the bottom of the screen as shown in the figures. The selectable marker 1505a is associated with the first image 1510a. The selectable marker 1505b is associated with the second image 1510b. The selectable marker 1505c is associated with the third image 1510c. The selectable marker 1505d is associated with the fourth image 1510d. The selectable marker 1505e is associated with the fifth image 1510e. The selectable marker 1505f is associated with the sixth image 1510f.

The processor is also adapted to apply transparency effects to the plurality of images that form the composite image 1500. This is useful when only a selection of the component images have the transparency effect applied. In this embodiment the transparency effect is applied to all of the images except to one of the images that is designated the primary or "hero" image. The primary image is selected by the processor to be the final image in the sequence by default. The primary image is therefore emphasised relative to the other images in the sequence which can enhance the illusion of motion in the composite image.

FIG. 15a shows the sixth selectable marker 1505f having a ring 1515 displayed around it. This provides feedback to a user that the sixth image 1510f is selected as the primary image. It will also be seen that the first to sixth selectable markers 1505a, 1505b, 1505c, 1505d, 1505e and 1505f are all displayed as solid circles. This provides feedback to the user that all of the six composite images of the sequence of images are displayed in the composite image 1500.

The processor is configured to receive user input from the user by way of an interaction with the selectable markers 1505a, 1505b, 1505c, 1505d, 1505e and 1505f to cause an editing function, which in this embodiment comprises modifying the composite image by adding or removing respective component images therefrom. Thus, after each selection by a user of a selectable marker, the processor displays the modified composite image to show the result of adding or removing the selected component image.

FIG. 15b shows the user interface after several user selections as well as a correspondingly modified composite image 1520. In particular, the processor has received user selection comprising a selection of the second selectable marker 1505b. In response to this user selection the processor has removed the second component image 1510b from the set of images that are used to form the composite image. The processor then displayed a modified composite image having the second component image 1510b removed therefrom. The processor has changed the appearance of the selectable marker 1505b to show that the second image 1510b is no longer displayed in the composite image. The second selectable marker 1505b is therefore shown as a hollow circle.

The user then made a user selection of the fourth selectable marker 1505d. Likewise, the processor removed the fourth component image 1510d from the set of images that form the composite image and displayed a modified composite image using the modified set of images. Further, the fourth selectable marker 1505f was modified to be shown as a hollow circle.

The user then made a user selection of the sixth selectable marker 1505f. Likewise, the processor removed the sixth component image 1510f from the set of images that form the composite image and displayed a modified composite image using the modified set of images. Further, the sixth selectable marker 1505f was modified to be shown as a hollow circle The user then made a user selection of the first selectable marker 1505a. Likewise, the processor removed the first component image 1510a from the set of images that form the composite image and displayed a modified composite image using the modified set of images. Further, the first selectable marker 1505a was modified to be shown as a hollow circle. The user then did not like the displayed resulting composite image and decided to reinstate the first image 1510a in the composite image. Accordingly the processor received a user selection of the first selectable marker 1505a. The processor then added the corresponding image, first image 1510a, to the set of images that form the composite image and displayed a modified composite image using the modified set of images. The first selectable marker 1505a was modified to be shown as a solid circle once again. The result of the above selections is shown in FIG. 15b, which shows a composite image 1520 that is formed from the first, third and fifth component images 1510a, 1510c, 1510e in the sequence of images.

When the user selected the sixth selectable marker 1505f the corresponding sixth image 1510f was removed from the set of images that form the composite image. The sixth image 1510f was set to be the primary image by default in FIG. 15a. Accordingly, when the user selected the sixth selectable marker 15105f the designation of a primary image was also removed by the processor. The processor therefore no longer applied any transparency effects to the composite image. During the above described user selections, the user also made a gesture to select the fifth image 1510e as the primary image. In this embodiment the user applies a double tap on the fifth selectable marker 1505e. The processor is adapted to receive this user selection and designate the corresponding fifth image 1510e as the primary image. Accordingly, in forming the composite image 1520, the processor provides for the first and third images 1510a, 1510c to have the transparency effect applied thereto and the fifth image 1510e to not have the transparency effect applied.

In a second embodiment, the processor is adapted to associate each of the selectable markers with a plurality of images in the sequence of images. Thus, where the plurality of images in the sequence totals nine, a first selectable marker may be associated with the first, fourth and seventh images in the sequence. A second selectable marker may be associated with the second, fifth and eighth images in the sequence and a third selectable marker may be associated with the third, sixth and ninth images in the sequence. User selection of one of the markers will therefore add or remove all of the associated images from the set of images that form the composite image.

In a third embodiment, the processor does not initially include any of the plurality of images in the sequence in the set of images that are used to form the composite image. Therefore, all of the user selectable markers would be displayed as hollow circles (if using the same feedback as in the previous embodiment, which will be appreciated as not essential). The processor therefore adds images to the set of images that form the composite image with each user selection of a selectable marker (or removes an image if it has already been added). This embodiment can be advantageous as the processor can be configured to initially display instructions for a user on how to use the selectable markers to form a composite image. When the user makes their first selection of a selectable marker, the instructions are removed and the composite image is displayed in their place.

Figure 16:
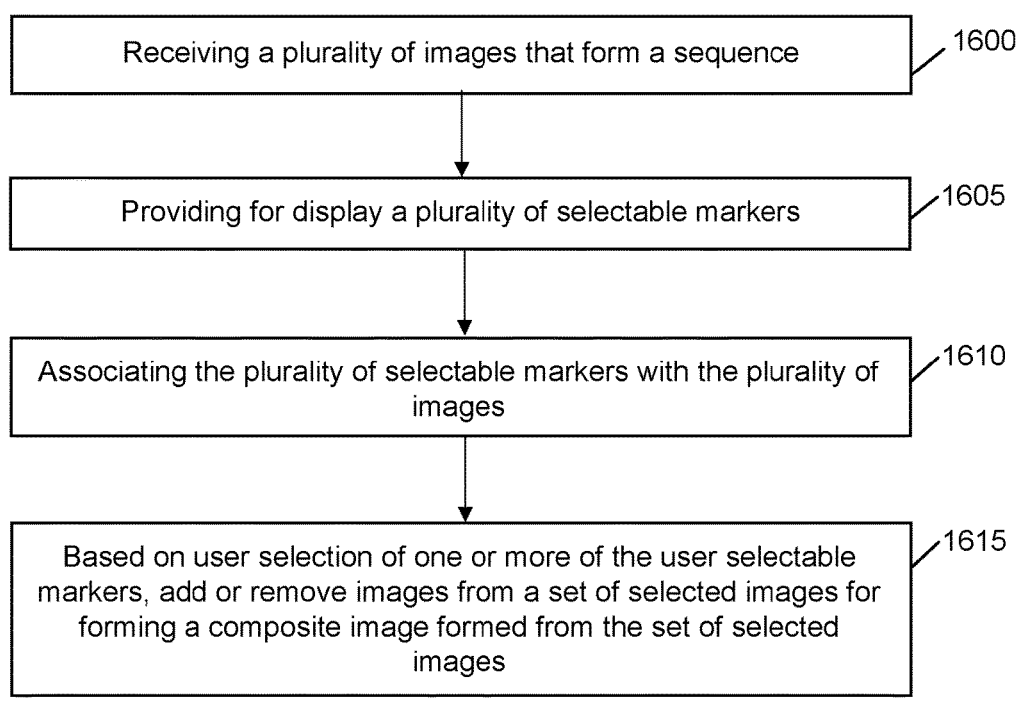
FIG. 16 illustrates a flowchart according to a method of the present disclosure.

FIG. 16 shows a flow diagram illustrating the steps of receiving a plurality of images that form a sequence 1600, providing for display a plurality of selectable markers 1605, associating the plurality of selectable markers with the plurality of images 1610, based on user selection of one or more of the user selectable markers, add or remove images from a set of selected images for forming a composite image formed from the set of selected images 1615 and is self-explanatory.

Image editing can be used to modify images. One type of image editing comprises feature removal. Feature removal can be used to hide features within an image so that it appears the feature was not present in the originally captured scene. For example, a user may wish to capture an image of a boat passing in front of a sunset. Just as the boat reaches the centre of the setting sun the user presses a shutter button to capture the image. Unfortunately, when reviewing the image, the user notices that a plastic carrier back was blown into shot over the sky and captured in the image. The presence of the carrier bag spoils the image. Image removal can identify features in the image, such as the plastic bag or lens flare for example, and using portions of the image surrounding the identified feature hide it from view. This may be achieved using any known technique. For example, an overlay may be created having the same colours and textures of the image in the region surrounding the identified feature. When the overlay is placed over the plastic bag, it hides it.

Feature removal is a complex and daunting image editing feature for a user to use. A user typically has to make numerous actions to operate and adjust the feature removal process. It would be advantageous to provide an easy to use and intuitive interface for applying a feature removal process to an image.

FIGS. 17a-d shows a first embodiment of a fourth aspect of the invention. FIGS. 17a to d shows an interface for interacting with a feature removal algorithm.

Figure 17A:
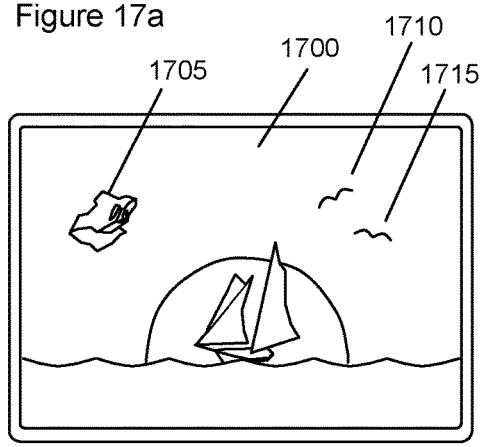
FIGS. 17a-d illustrate a first embodiment of the invention

FIG. 17a shows the image 1700 captured by the user of the boat passing in front of the sunset. The unsightly plastic bag 1705 is in the top left corner. A first seagull 1710 and a second seagull 1715 are present in the top right corner. A known feature detection/removal algorithm is used to identify to the processor features in the image that it is able to hide. In this example, the feature detection/removal algorithm has identified the plastic bag 1705 and first and second seagulls 1710, 1715 as features that it can hide.

Figure 17B:
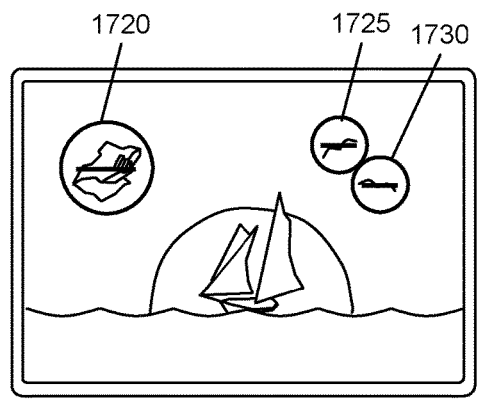

The processor is configured to provide for the display of a user selectable marker 1720, 1725, 1730 to mark the position in the image 1700 at which the identified features are present. Each selectable marker is associated with a respective identified feature. Each of the identified features is still visible beneath its associated marker. To make the visibility of the identified feature easier for the user, the markers may be partially transparent or may be displayed and not displayed periodically. This will make it easier for the user to make out which features in the image are hideable. FIG. 17b shows the same image 1700 as FIG. 17a with the markers displayed over the associated identified features. Marker 1720 marks the position of the feature 1705, marker 1725 marks the position of feature 1710, and marker 1730 marks the position of feature 1715. The user selectable markers 1720, 1725, 1730 are presented with a minus symbol to provide feedback to the user that actuating the user selectable markers will hide the feature with which the marker is associated.

Figure 17C:
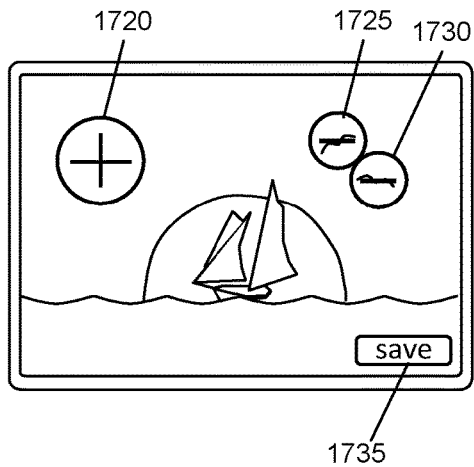

The user decides to remove the plastic bag 1705 from the image. Accordingly, processor receives a user selection of user selectable marker 1720. In response to said user selection, the processor uses the feature detection/removal algorithm or data previously received therefrom to hide the plastic bag 1705. Accordingly, a modified version of image 1700 is shown with the plastic bag 1705 hidden from view as shown in FIG. 17c. The processor also changes the appearance of the selectable marker 1720 to present a plus symbol rather than a minus symbol. This provides convenient feedback to a user that the associated identified feature has been hidden and a further actuation of the selectable marker 1720 will show the identified feature 1705.

Figure 17D:
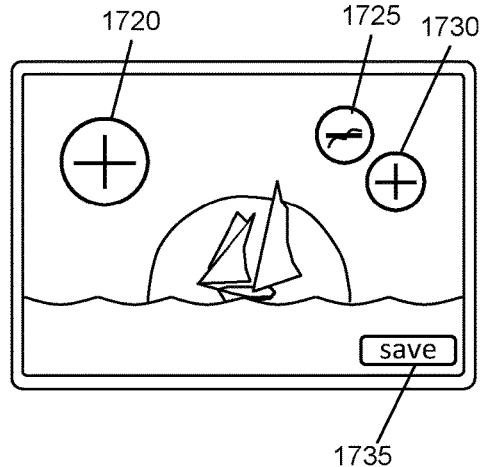

In FIG. 17d, the processor has received a user selection of marker 1730. Accordingly, the processor is configured to hide the second seagull 1715 using the feature detection/removal algorithm. A further modified version of the image 1700 with the plastic bag 1705 and the second seagull 1715 hidden from view is displayed. As with marker 1720, the appearance of marker 1730 is altered to present a plus symbol rather than a minus symbol.

The user then decides that the image looked better with the second seagull and provides user input to select the selectable marker 1730. The processor receives the user input and causes the second seagull 1715 to be shown once again. Thus, the processor uses the feature detection/removal algorithm or data previously received therefrom to modify the image 1700 such that the second seagull is shown, while the plastic bag remains hidden. Thus, the user has returned to the position depicted in FIG. 17c.

The processor may be configured to present an option 1735 to save an image incorporating the selected changes, if any, made by the feature detection/removal algorithm.

Figure 18A:
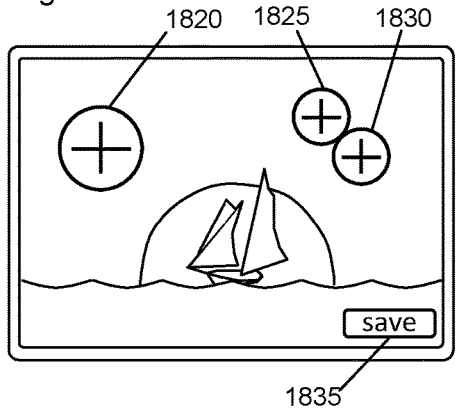
FIGS. 18a-b illustrate a second embodiment of the invention
Figure 18B:
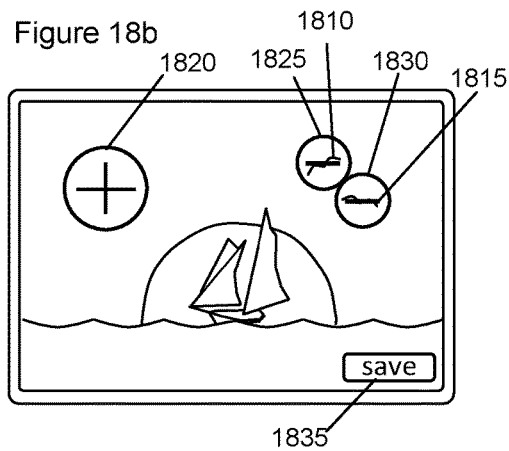

FIGS. 18a and 18b show a second embodiment. In this embodiment the processor receives an image and uses the feature detection/removal algorithm to identify features in the image that can be hidden from view. The processor is configured to initially display a modified version of the image with all of the identified features hidden by the feature detection/removal algorithm. The user interface presented to the user is similar in appearance and function to the previous embodiment but in this instance user selectable markers 1820, 1825 and 1830 are displayed in a position corresponding to their associated features, which are hidden from view. The user selectable markers 1820, 1825 and 1830 are now each presented with a plus symbol to provide feedback that features at those locations have been identified and hidden and can be shown upon user selection of the associated marker 1820, 1825 and 1830.

The user provides user input to select marker 1825 and 1830. The processor receives the user input and causes the first seagull 1810 and second seagull 1815 to be shown. Thus, the processor uses the feature detection/removal algorithm to generate an image that includes the features 1810 and 1815 selected by the user. This modified image is then displayed as shown in FIG. 18b. As in the previous embodiment, feedback is provided by the processor by changing the symbol presented with the markers 1825, 1830 to indicate that a further user selection will cause the processor to cause the marked features to be hidden once again. An option 1835 is also present to allow the user to save the image with the selected changes applied.

It will be appreciated that in the previous two embodiments the markers are presented as circles with a symbol therein. The circles may be different sizes depending on the size of the identified feature. The marker could be displayed as a line marking the perimeter of feature that has been identified for addition or removal. The marker may not be centred on the feature it is marking. Instead, the marker could comprise an arrow that points to the position of the identified feature. It will be appreciated symbols other than a plus or minus could be used, such as words or colours or no symbols at all.

Figure 19A:
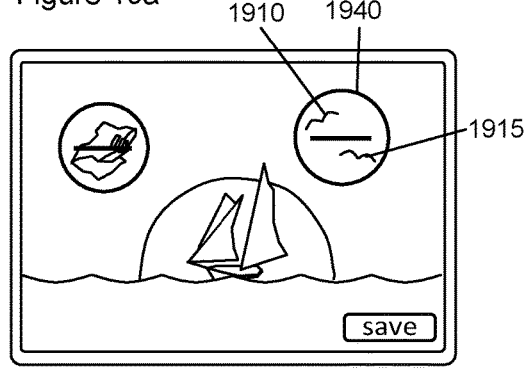
FIGS. 19a-b illustrate a third embodiment of the invention
Figure 19B:
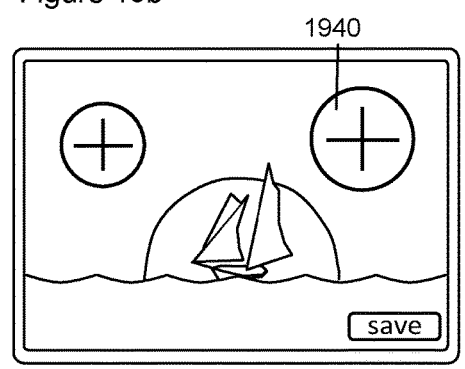

FIGS. 19a to 19b show a third embodiment which is similar to the first embodiment of this aspect. In this embodiment the processor has received from the feature detection/removal algorithm the location of the features that are hideable. However, rather than present the interface shown in FIG. 17b, the processor is configured to perform a clustering step. The clustering step is performed to associate two or more identified features for treatment as a single identified feature.

The processor in this embodiment implements the clustering step by measuring the distance between the positions of features identified by the feature detection/removal algorithm. Thus, the processor determines a measurement point of the identified feature 1910, which may comprises the centre of the feature. Likewise, the processor determines a measurement point of the identified feature 1915. The processor then measures the distance between the two measurement points. If the measured distance is less than a predetermined threshold, which could be 100 pixels, then the processor clusters the two identified features 1910, 1915. Thus, the processor creates a single user selectable marker 1940 that it associates with both the identified feature 1910 and the identified feature 1915. The marker 1940 is sized to surround both the first feature 1910 and second feature 1915 while being centred on a midpoint between the two clustered features 1910, 1915.

User input that selects the marker 1940, shown in FIG. 19a, causes the processor to hide from view both the first seagull 1910 and second seagull 1915. As discussed above, the processor may use data from the feature detection/removal algorithm to hide the identified features or it may provide instructions for the feature detection/removal algorithm such that the algorithm generates a modified image with the identified features 1910, 1915 removed as shown in FIG. 19b.

Figure 20A:
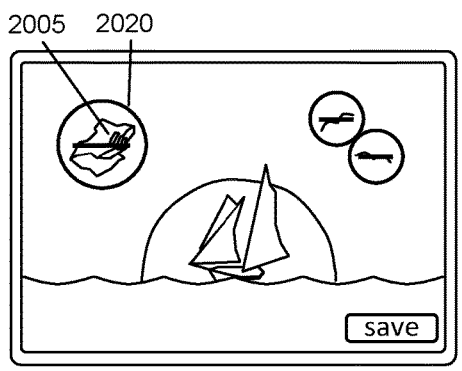
FIGS. 20a-b illustrate a fourth embodiment of the invention
Figure 20B:
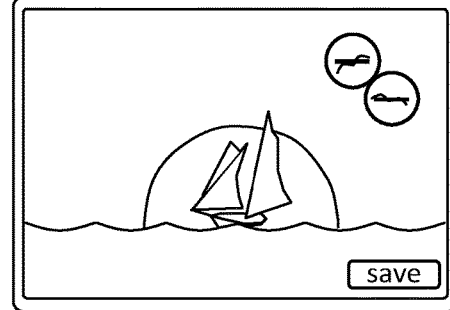

FIGS. 20a and 20b show a fourth embodiment that operates in substantially the same manner as the first embodiment of this aspect. As shown in FIG. 20a, the processor provides an interface that allows the selection of markers that mark hideable features identified by a feature detection/removal algorithm. This is equivalent to the functionality described in relation to FIGS. 17a and 17b. However, on receipt of user input to select the selectable marker 2020, the processor hides the feature 2005 but does not provide for display of the marker 2020 once the feature 2005 has been hidden. Thus, once the user has selected to remove the feature 2005, the action cannot be undone by way of a further actuation on a marker.

FIG. 21 shows a flow diagram illustrating the steps of marking the position of at least one identified feature in an image which is hideable from view using a region of the image surrounding the identified feature 2100, providing for display at least one selectable marker that marks the position of at least one identified feature 2105, in response to user input selecting the marker hiding or showing the identified feature 2110 and is self-explanatory.

Different types of image effect can be applied to an image. Typically, the image effect types have parameters associated therewith that may adjust the strength of the image effect type. For example, one image effect type could be brightness and the parameter is brightness level. As a further example, contrast is a second image effect type and its parameter is contrast level.

The making of adjustments to an image by applying image effects can be a time consuming process for a user as they navigate menu systems to select the various image effect types and then select further options to change the parameters associated with the image effect type.

It would be advantageous to provide a way of quickly and easily adjusting image effect types and image effect parameters or any other parameter.

In a first embodiment of this fifth aspect, a processor provides for the display of an image that the user wishes to apply image effects to. The processor is configured to allow adjustment of the parameters of two effect types simultaneously. The processor associates a first image parameter with user swiping input along a first axis. A second image parameter is associated with user swiping input along a second axis, different to the first axis. Typically, the first image parameter will be associated with user swiping input relative to a first axis that is arranged vertically with respect to the display. Typically, the second image parameter will be associated with user swiping input relative to a second axis that is arranged horizontally with respect to the display.

In the example of FIGS. 22a to 22b, the first image effect type is image brightness, which is associated with the first, vertical axis. The second image effect type is image contrast, which is associated with the second, horizontal axis.

In FIG. 22a an image of a box 2205 is displayed. The user places their finger on the screen to begin a swiping input in the direction of arrow 2210. Optionally, the processor displays a first indicator 2215 for the current value of the first parameter and a second indicator 2220 for the current value of the second parameter. Movement in the direction of the arrow 2210 results in movement relative to the first axis and movement relative to the second axis.

FIG. 22b shows the progressive user swiping input having reached a point along the direction of the arrow 2210. In response to said user swiping input the processor is configured to determine the amount of progressive movement the user swiping input has made relative to the first axis and the amount of movement the user swiping input has made relative to the second axis. Based on these amounts the processor is configured to simultaneously and progressively adjust both of the respective image parameters. The processor may achieve this in any appropriate manner. For example, it may repeatedly project the user swiping input onto the first and second axis to track the movement relative to those axes and update the image parameters accordingly.

In FIG. 22b the progressive user swiping input has been measured with respect to the first axis and second axis and the processor has progressively increased the first parameter by twenty increments and the second parameter by twelve increments. The processor is configured to progressively display the two image effects applied to the image with their associated parameters during the user swiping input. This allows the user to see the effect of adjusting two image parameters simultaneously.

FIG. 23 shows a flow diagram illustrating the steps of receiving progressive user swiping input 2300, progressively adjusting a first image parameter in response to the amount of progressive user swiping input relative to a first axis and simultaneously progressively adjusting a second image parameter, different to the first image parameter, in response to the amount of progressive user swiping input relative to a second axis 2305; and providing for display of said image with modifications made thereto based on the first image parameter and second image parameter 2310 and is self-explanatory.

Image effects can be applied to live images. A live image is one that is displayed as it is received from a camera. It would be advantageous to be able to adjust a parameter of an image effect as it is applied to a live image.

A first embodiment of a sixth aspect is shown in FIG. 24a-c. In this embodiment a live image is displayed from a camera. The processor is configured to receive user swiping input and in response to said swiping input progressively adjust an image effect type or image parameter associated with the image effect. In this embodiment the image effect is brightness and the user swiping input is configured to adjust the brightness level of the brightness effect applied to the live image.

Thus, in FIG. 24a the user begins the swiping input at position 2410 and the processor applies a first brightness level. By FIG. 24b the progressive user swiping reached point 2420 and has caused the processor to progressively apply a second brightness level stronger than the first to the live image. Continuation of the user swiping input, shown in FIG. 24c at point 2430, causes the processor to progressively apply a third brightness level strongest that the first and second levels to the live image.

Thus, the user is provided with an effective input method for adjusting image parameters or image effect types applied to a live image.

Figure 25:
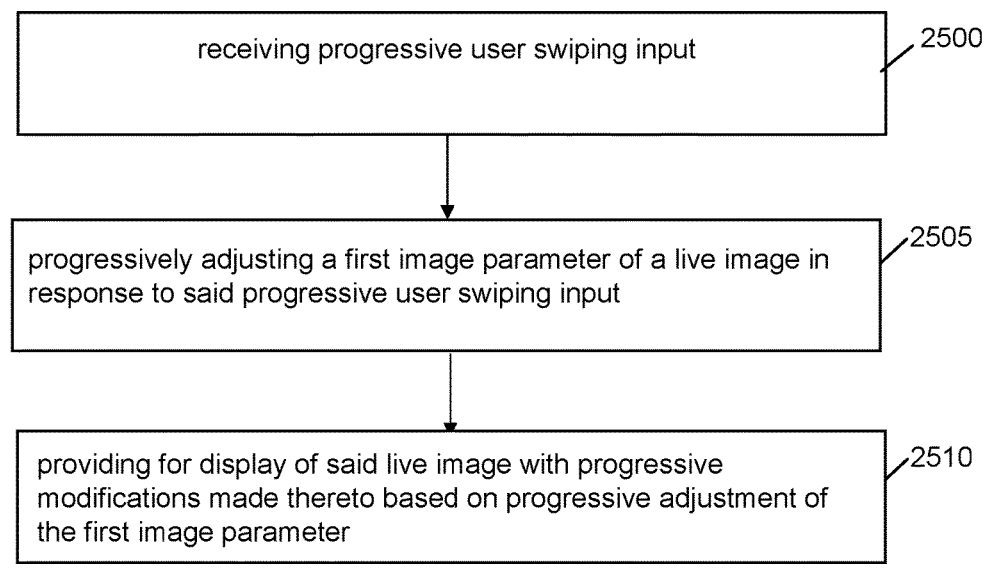
FIG. 25 illustrates a flowchart according to a method of the present disclosure.

FIG. 25 shows a flow diagram illustrating the steps of receiving progressive user swiping input 2500, progressively adjusting a first image parameter of a live image in response to said progressive user swiping input 2505, and providing for display of said live image with progressive modifications made thereto based on progressive adjustment of the first image parameter 2510 and is self-explanatory.

Figure 26:
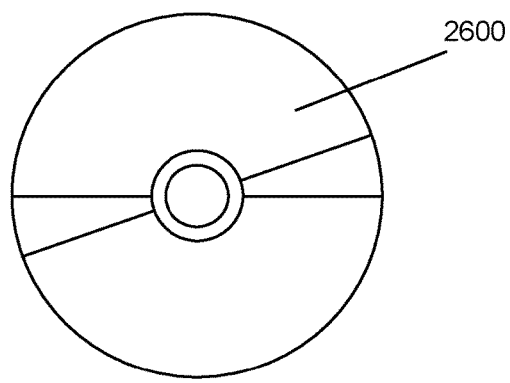
FIG. 26 illustrates schematically a computer readable medium providing a program.

FIG. 26 illustrates schematically a computer/processor readable medium 2600 providing a program according to an example. In this example, the computer/processor readable medium is a disc such as a digital versatile disc (DVD) or a compact disc (CD). In other examples, the computer readable medium may be any medium that has been programmed in such a way as to carry out an inventive function. The computer program code may be distributed between the multiple memories of the same type, or multiple memories of a different type, such as ROM, RAM, flash, hard disk, solid state, etc.

The processor of the above examples may form part of an apparatus which may be a portable electronic device, a laptop computer, a mobile phone, a Smartphone, a tablet computer, a personal digital assistant, a digital camera, a watch, a non-portable electronic device, a desktop computer, a monitor, a server, or a module/circuitry for one or more of the same.

Any mentioned apparatus/device and/or other features of particular mentioned apparatus/device may be provided by apparatus arranged such that they become configured to carry out the desired operations only when enabled, e.g. switched on, or the like. In such cases, they may not necessarily have the appropriate software loaded into the active memory in the non-enabled (e.g. switched off state) and only load the appropriate software in the enabled (e.g. on state). The apparatus may comprise hardware circuitry and/or firmware. The apparatus may comprise software loaded onto memory. Such software/computer programs may be recorded on the same memory/processor/functional units and/or on one or more memories/processors/functional units.

In some examples, a particular mentioned apparatus/device may be pre-programmed with the appropriate software to carry out desired operations, and wherein the appropriate software can be enabled for use by a user downloading a "key", for example, to unlock/enable the software and its associated functionality. Advantages associated with such examples can include a reduced requirement to download data when further functionality is required for a device, and this can be useful in examples where a device is perceived to have sufficient capacity to store such pre-programmed software for functionality that may not be enabled by a user.

Any mentioned apparatus/circuitry/elements/processor may have other functions in addition to the mentioned functions, and that these functions may be performed by the same apparatus/circuitry/elements/processor. One or more disclosed aspects may encompass the electronic distribution of associated computer programs and computer programs (which may be source/transport encoded) recorded on an appropriate carrier (e.g. memory, signal).

Any "computer" described herein can comprise a collection of one or more individual processors/processing elements that may or may not be located on the same circuit board, or the same region/position of a circuit board or even the same device. In some examples one or more of any mentioned processors may be distributed over a plurality of devices. The same or different processor/processing elements may perform one or more functions described herein.

With reference to any discussion of any mentioned computer and/or processor and memory (e.g. including ROM, CD-ROM etc), these may comprise a computer processor, Application Specific Integrated Circuit (ASIC), field-programmable gate array (FPGA), and/or other hardware components that have been programmed in such a way to carry out the inventive function.

The applicant hereby discloses in isolation each individual feature described herein and any combination of two or more such features, to the extent that such features or combinations are capable of being carried out based on the present specification as a whole, in the light of the common general knowledge of a person skilled in the art, irrespective of whether such features or combinations of features solve any problems disclosed herein, and without limitation to the scope of the claims. The applicant indicates that the disclosed aspects/examples may consist of any such individual feature or combination of features. In view of the foregoing description it will be evident to a person skilled in the art that various modifications may be made within the scope of the disclosure.

While there have been shown and described and pointed out fundamental novel features as applied to examples thereof, it will be understood that various omissions and substitutions and changes in the form and details of the devices and methods described may be made by those skilled in the art without departing from the scope of the disclosure. For example, it is expressly intended that all combinations of those elements and/or method steps which perform substantially the same function in substantially the same way to achieve the same results are within the scope of the disclosure. Moreover, it should be recognized that structures and/or elements and/or method steps shown and/or described in connection with any disclosed form or examples may be incorporated in any other disclosed or described or suggested form or example as a general matter of design choice. Furthermore, in the claims means-plus-function clauses are intended to cover the structures described herein as performing the recited function and not only structural equivalents, but also equivalent structures. Thus although a nail and a screw may not be structural equivalents in that a nail employs a cylindrical surface to secure wooden parts together, whereas a screw employs a helical surface, in the environment of fastening wooden parts, a nail and a screw may be equivalent structures.

The invention claimed is:

1. An apparatus comprising:
at least one processor; and
at least one memory including computer program code,
the at least one memory and the computer program code configured to, with the at least one processor, cause the apparatus to perform at least the following:
determining a plurality of features in at least a first image of a sequence of images capturing a movement;
receiving an indication of a user input selecting a selectable marker, the selectable marker marking a position of at least one identified feature in the first image of the sequence of images capturing the movement, wherein the at least one identified feature is hideable from view using a region of the image surrounding the identified feature;
identifying, in a second image of the sequence of images, another instance of the at least one identified feature marked by the selected marker from the first image of the sequence of images; and
in response to the indication of the user input, hiding the another instance of the at least one identified feature in the second image of the sequence of images by generating an overlay of the identified feature using the region of the image surrounding the identified feature.

2. The apparatus of claim 1, wherein the selectable marker comprises a ring or circular ring that surrounds the at least one identified feature.

3. The apparatus of claim 1, wherein when a plurality of features are identified, each feature is marked by a respective selectable marker comprising a ring or circular ring that surrounds the respective feature.

4. The apparatus of claim 1, wherein the apparatus is configured to initially provide for display of the image without any of the identified features hidden and the selectable markers are initially configured to allow for the hiding of a respective feature in response to said user input selection.

5. The apparatus of claim 1, wherein the apparatus is configured to base on user input to select a save command, save the image to memory with selected features hidden and shown as they were selected on actuation of said save command.

6. The apparatus of claim 1, wherein the selectable markers are displayed partially transparent.

7. The apparatus of claim 1, wherein the selectable markers are periodically displayed and not displayed.

8. The apparatus of claim 1, wherein the apparatus is a portable electronic device, a laptop computer, a mobile phone, a Smartphone, a tablet computer, a personal digital assistant, a digital camera, a watch, a server, or a module/circuitry for one or more of the same.

9. The apparatus of claim 1, wherein the apparatus is a non-portable electronic device, a desktop computer, a monitor, a server, or a module/circuitry for one or more of the same.

10. The apparatus of claim 1, wherein the apparatus is configured, when two or more features are identified, associate the two or more identified features such that they are treated as a single feature by determining if said two or more identified features satisfy a predefined clustering criterion.

11. The apparatus of claim 10, wherein the apparatus is configured such that said association allows the two or more associated features to be hidden together in response to said user input selection using a single marker marking the position of the associated features.

12. The apparatus of claim 10, wherein the mark applied to mark the position of associated features comprises a ring that surrounds the associated features.

13. The apparatus of claim 10, wherein the predefined clustering criterion is satisfied if the region of the image surrounding the one of the identified features overlaps with the region of the image surrounding the other of the identified features.

14. The apparatus of claim 10, wherein the predefined clustering criterion is satisfied if the two or more identified features are within a predetermined distance of one another.

15. The apparatus of claim 10, wherein the predefined clustering criterion is satisfied if the regions of the image surrounding the two or more identified features are of a hue that falls within a predetermined hue range of one another.

16. The apparatus of claim 1, wherein the at least one memory and the computer program code are further configured to, with the at least one processor, cause the apparatus to perform at least the following:
in response to the indication of the user input, cause display of an additional selectable marker configured to redisplay the identified feature; and
in response to an indication of a selection of the additional selectable marker, redisplay the identified feature in a subsequent image of the sequence of images.

17. A method, the method comprising
determining a plurality of features in at least a first image of a sequence of images capturing a movement;
in response to receiving user input selecting a selectable marker, the selectable marker marking a position of at least one identified feature in the first image of the sequence of images capturing the movement, wherein the at least one identified feature is hideable from view using a region of the image surrounding the identified feature;
identifying, in a second image of the sequence of images, another instance of the at least one identified feature marked by the selected marker from the first image of the sequence of images; and
in response to the indication of the user input, hiding the another instance of the at least one identified feature in the second image of the sequence of images by generating an overlay of the identified feature using the region of the image surrounding the identified feature.

18. The method of claim 17, further comprising:

in response to the indication of the user input, causing display of an additional selectable marker configured to redisplay the identified feature; and in response to an indication of a selection of the additional selectable marker, redisplaying the identified feature in a subsequent image of the sequence of images.

19. A computer readable medium comprising computer program code stored thereon, the computer readable medium comprising at least one non-transitory medium, the computer readable medium and computer program code being configured to, when run on at least one processor, perform:

determining a plurality of features in at least a first image of a sequence of images capturing a movement;

receiving an indication of a user input selecting a selectable marker, the selectable marker marking a position of at least one identified feature in the first image of the sequence of images capturing the movement, wherein the at least one identified feature is hideable from view using a region of the image surrounding the identified feature;

identifying, in a second image of the sequence of images, another instance of the at least one identified feature marked by the selected marker from the first image of the sequence of images; and in response to the indication of the user input, hiding the another instance of the at least one identified feature in the second image of the sequence of images by generating an overlay of the identified feature using the region of the image surrounding the identified feature.

\* \* \* \* \*